United States Patent [19]

Frattarola et al.

[11] 4,035,614
[45] July 12, 1977

[54] CARD VALIDATING APPARATUS

[75] Inventors: Joseph R. Frattarola, Westford; Peter W. Ford, Winchester, both of Mass.; James P. Santagata, Pittsford, N.Y.

[73] Assignee: UMC Industries, Inc., Stamford, Conn.

[21] Appl. No.: 670,391

[22] Filed: Mar. 25, 1976

[51] Int. Cl.² .................. G06K 5/00; G06K 7/08; G07F 7/02
[52] U.S. Cl. .................. 235/61.7 B; 235/61.11 R; 340/149 A
[58] Field of Search .............. 235/61.7 B, 61.7 R, 235/61.11 R, 61.11 D; 340/149 A

[56] References Cited

U.S. PATENT DOCUMENTS

| 3,626,160 | 12/1971 | Hagopian | 235/61.7 B |
|---|---|---|---|
| 3,673,389 | 6/1972 | Kapsambelis et al. | 235/61.7 B |
| 3,761,683 | 9/1973 | Rogers | 235/61.7 B |
| 3,786,421 | 1/1974 | Wostl et al. | 235/61.7 B |
| 3,985,998 | 10/1976 | Crafton | 235/61.7 B |
| 3,990,558 | 11/1976 | Ehrat | 235/61.7 B |

Primary Examiner—Daryl W. Cook
Attorney, Agent, or Firm—Koenig, Senniger, Powers and Leavitt

[57] ABSTRACT

Apparatus for validating a card having positioned thereon a plurality of redundant encoded blocks of data readable by moving the card past a reader and for controlling the movement of such a card whose validity is to be determined. A card transporter moves a card along a predetermined path. A reader senses each block of data on the card as it moves forward along the path from an entry position to a dwell or escrow position and supplies an electrical signal representative of the data in each block. A card validator responsive to this signal compares data derived from at least one block thereof with a preselected set of data in making the validity determination. The validator includes circuitry for combining the data from at least one block with a prior set of data to produce a stored resultant set of data, and for comparing it with a preselected set of data and for supplying an indication of card validity if these sets of data are identical. If the card is not determined to be valid, the card transporter returns it to the entry position. A valid card remains in the escrow position pending either subsequent collection thereof or the return thereof.

57 Claims, 26 Drawing Figures

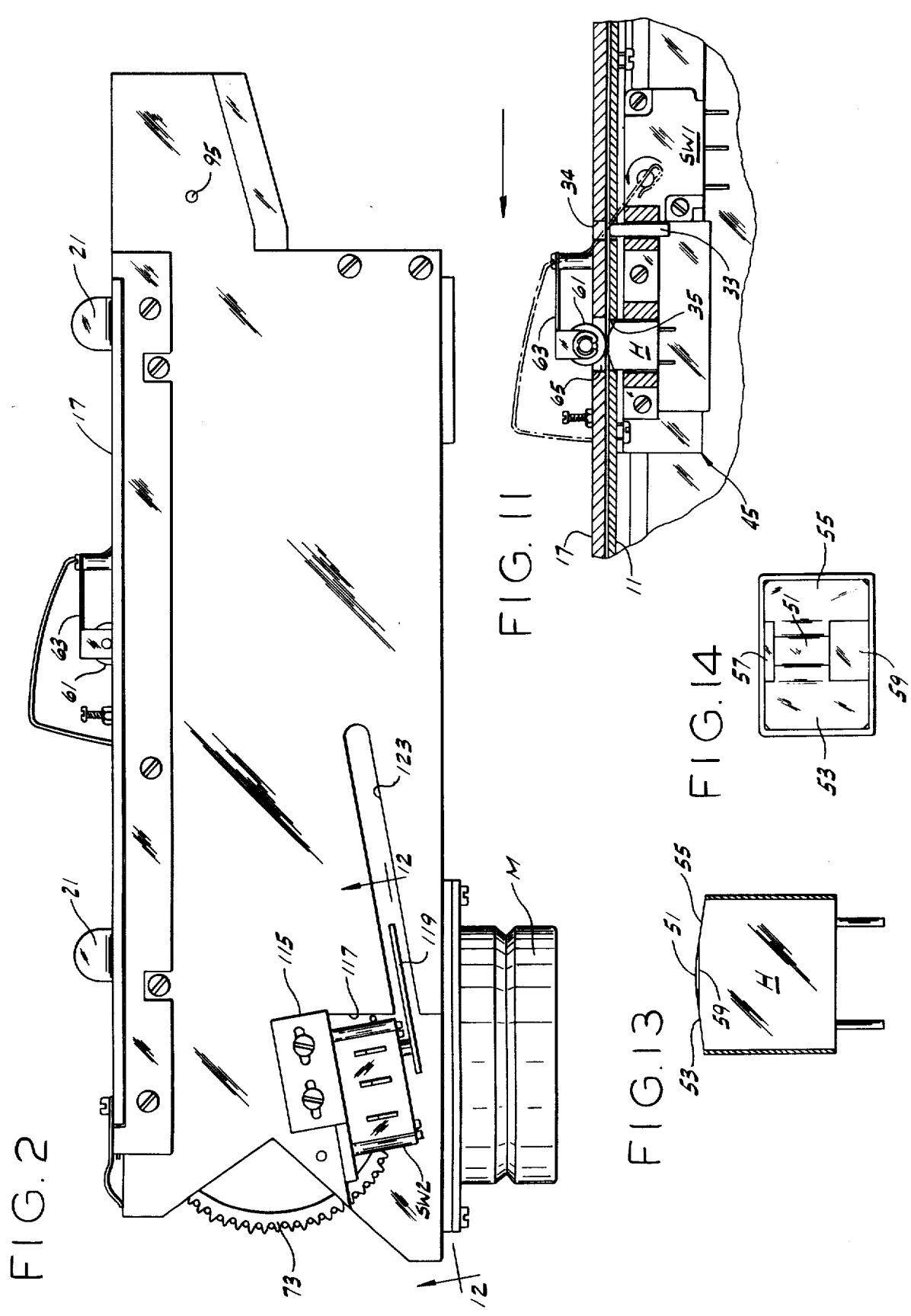

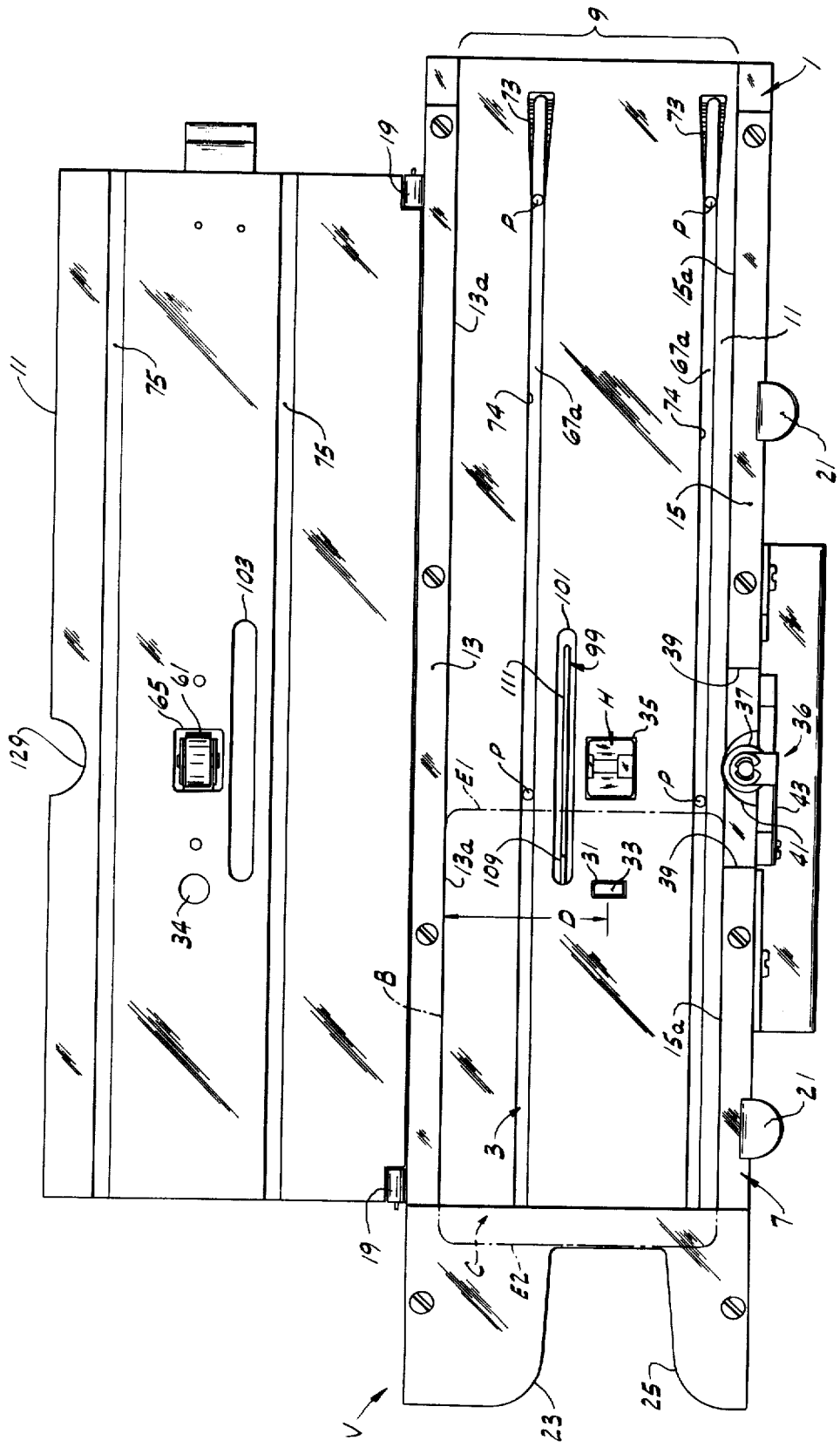

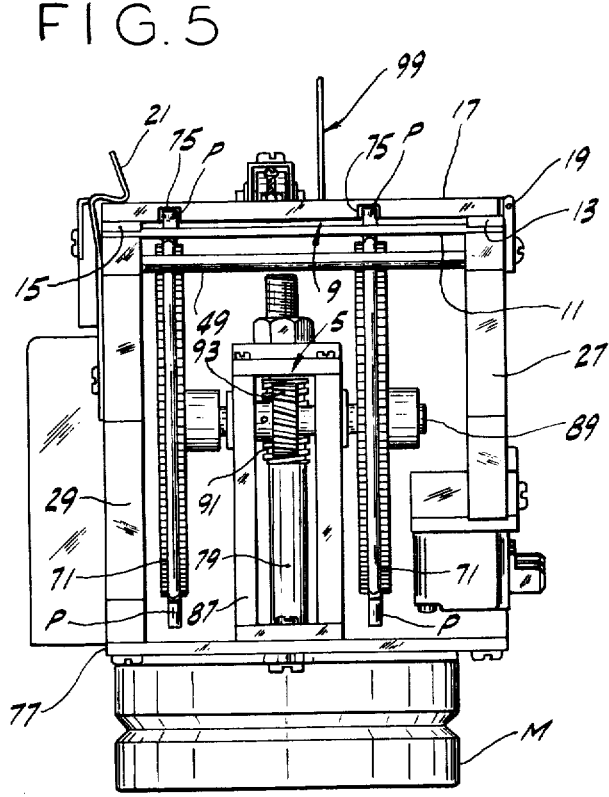
FIG. 5
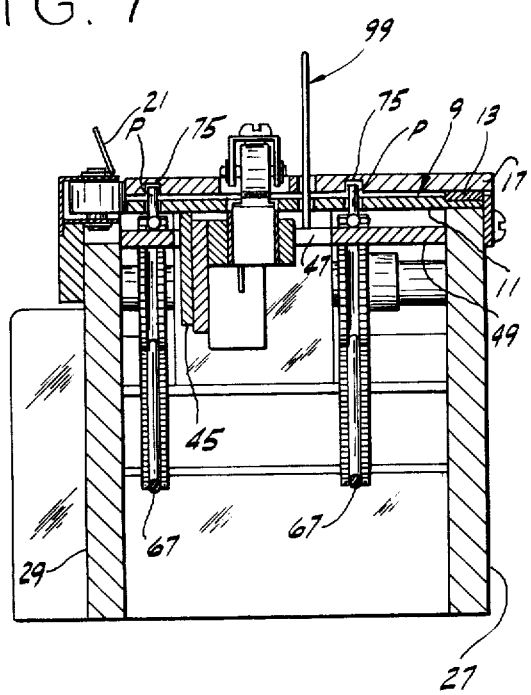
FIG. 7
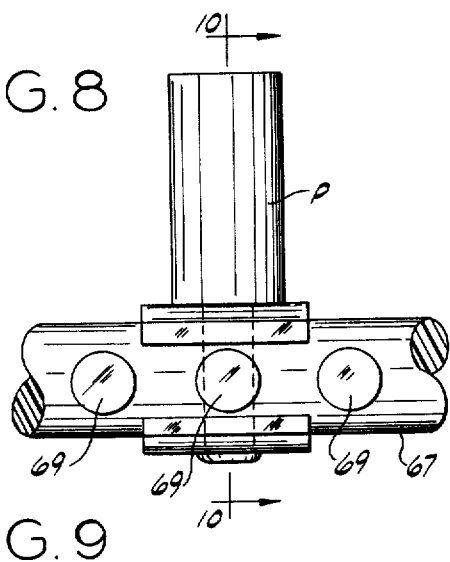
FIG. 8
FIG. 9
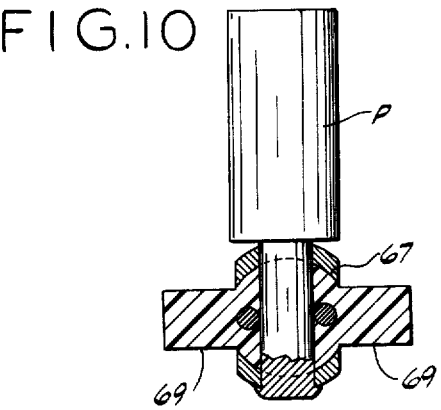
FIG. 10

CARD VALIDATING APPARATUS

BACKGROUND OF THE INVENTION

This invention relates to card validating apparatus and, more particularly, to apparatus for validating a card having positioned thereon a plurality of encoded blocks of data and for controlling the movement of such a card.

In the vending business, vendors are used for dispensing high value items, such as a carton of cigarettes, whose unit price makes it unrealistic to assume that a customer desiring to purchase an item always has the requisite amount of coins and currency available to him for use in the vendor. Consequently, there are advantages in enabling a customer to purchase a vending instrument, such as a card made of plastic or other suitable material, from, for example, a store clerk, and then use the card, at his convenience, to purchase the item. In practice, the customer inserts the card into a vendor, makes his selection, and the selected item is dispensed to the customer with the card being retained in the vendor.

Numerous problems arise in implementing such a purchasing system as outlined above. First, a vendor into which a card is inserted must reliably ascertain the acceptability, or validity, of the card for use in the vendor. This requires the card to have some type of code or identifying feature and for the vendor to have apparatus which can accurately sense the identifying code and make a decision as to the card's validity based upon what is sensed. However, repeated or prolonged usage of such cards tends to obliterate the identifying code and cause rejection of an otherwise valid card to the annoyance and distress of the user. Furthermore, there are myriad security problems in any vending system, including a coded-card operated one, all of which require anticipation thereof and means for preventing fraudulent schemes to obtain the vended merchandise without proper payment therefor. Moreover, card operated devices of any kind are subject to the jamming of the card in the card handling or processing mechanism which renders them inoperable until repaired thus causing economic disadvantages, particularly if the device is a vending machine.

SUMMARY OF THE INVENTION

Among the several objects of this invention may be noted the provision of card validating apparatus which will not reject as invalid a card which is otherwise valid but carries an identifying code which has been partially obliterated by wear or usage; the provision of such apparatus which is secure against various possible schemes to obtain a determination of card validity when a card is not valid or is improperly utilized; the provision of card validating apparatus which is not susceptible to internally generated electrical noise being interpreted as data and erroneously used in making a validity determination; the provision of such apparatus in which jamming of a card or faulty operation is sensed and damage which may result therefrom is prevented; and the provision of such apparatus which is highly reliable, low in cost, easy to serve and tamperproof.

Briefly, apparatus of this invention comprises a reader for sensing each of a plurality of redundant encoded blocks of data on a card and for supplying an electrical signal representative thereof as the card is moved past the reader and means responsive to this electrical signal for comparing the data derived from at least one block with a preselected set of data. Preferably this means combines the data from at least one block as it is sensed, with a prior set of data to form a resultant set of data. Means are provided for supplying an indication of card validity if the derived or resultant set of data and the preselected set of data are identical.

Generally, apparatus of the invention also controls the movement of a card whose validity is to be determined and comprises means for transporting a card along a predetermined path from an entry position to a second or dwell position. Means are provided for driving the card transport means to move the card along the path. A reader senses each block of data on the card as it moves forward along the path from the entry position and supplies an output signal representative thereof. Means responsive to the output signal from the reader as it senses the data from at least one block determines card validity and supplies an indication thereof. Means are provided for controlling the drive means. The drive control means are responsive to the positioning of the card in the entry position to actuate the drive means to move the card forward along the path, and are further responsive to the card's reaching the dwell position to deactuate the drive means and are also responsive to a validity indication from the validity determining means to temporarily maintain the drive means deactuated and retain the card in the dwell position, and are responsive upon failure of the validity determining means to indicate card validity to actuate the drive means to return the card from the dwell position to the entry position. Other objects and features will be in part apparent and in part pointed out hereinafter.

BRIEF DESCRIPTION OF THE DRAWINGS

FIG. 2 is a view in elevation of the other side of the validator;

FIG. 4 is a plan of the validator showing it with the lid open;

FIG. 5 is an end elevation of the validator as viewed on line 5—5 of FIG. 3;

FIG. 7 is a vertical transverse section taken on line 7—7 of FIG. 3;

FIG. 8 is a view in side elevation of a fragment of a belt conveyor of the validator;

FIG. 9 is a plan of FIG. 8;

FIG. 10 is a section on line 10—10 of FIG. 8;

FIG. 11 is a vertical longitudinal section on line 11—11 of FIG. 3;

FIG. 13 is an enlarged side elevation of a magnetic reading head of the validator;

FIG. 14 is a plan of FIG. 13;

Corresponding reference characters indicate corresponding parts through the several views of the drawings.

DESCRIPTION OF PREFERRED EMBODIMENT

Figure 18:
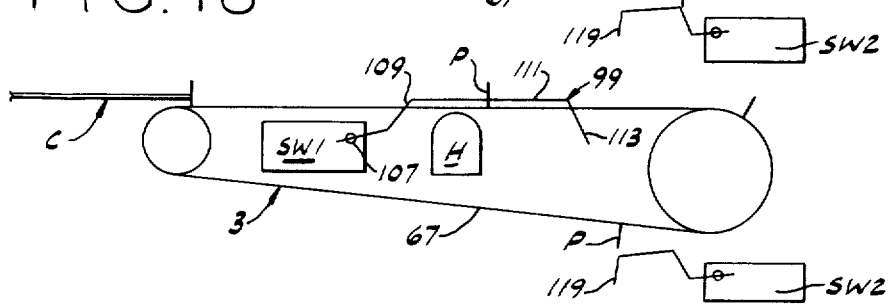
FIG. 18 is a view similar to FIGS. 15 and 16 showing a card being returned.
Figure 19:
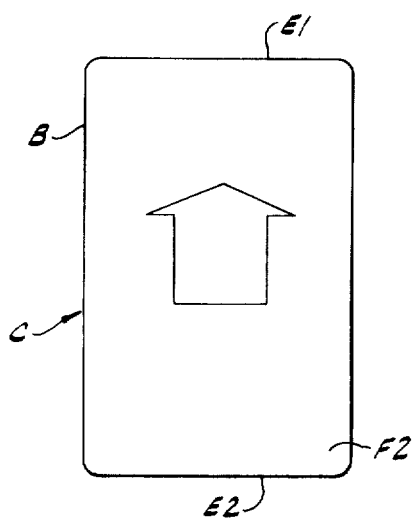
FIG. 19 is a plan of a card such as used in the validator of this invention.
Figure 20:
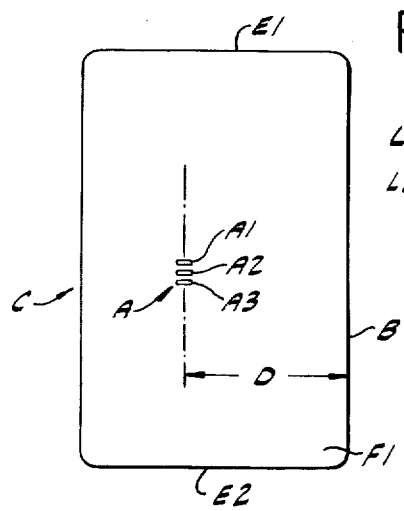
FIG. 20 is a view of the bottom of the card.
Figure 21:
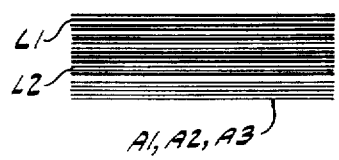
FIG. 21 is a greatly enlarged view of one block of code data on the card.

Referring to the drawings, a validator of this invention is indicated in its entirety at V in FIGS. 1–4 and 6. The validator is for validating a card C such as shown in FIGS. 19 and 20 bearing a code A shown as comprising a plurality of redundant encoded blocks of data. Three such blocks are shown in FIG. 20, designated A1, A2 and A3. Each block is identical (hence the reference to the blocks as being redundant, comprising a plurality of lines of magnetic material, such as a magnetic nickel-cobalt alloy, some of the lines being thin and others thick, arranged in a predetermined pattern. As shown in FIG. 21, the thick lines are designated L1 and the thin lines L2. The card itself is nonmagnetic, being made, for example, of suitable synthetic resin or plastic material. It is of rectangular shape, corresponding in length and width to the specifications of the American Bankers Association for magnetic stripe cards. The code A is on one face of the card F1 which may be referred to as its back or lower face. The other (front or upper) face F2 (see FIG. 19) bears the notation "This Side Up", an arrow indicating the direction in which the card is to be inserted in the validator, and the notation "Insert This End" at that end E1 of the card which is to be inserted in the validator. Code A is positioned a distance D from one edge B of the card constituting a datum edge, and the lines of each block of the code extend transversely of the card, at right angles to the datum edge, with high accuracy as to this right angle relationship. The code is magnetically readable by moving the card forward past a magnetic reading unit, e.g., a magnetic head H (see FIGS. 4, 6, 7 and 13–18) in longitudinal direction with respect to the code, which is in the direction of the datum edge B of the card.

Figure 15:
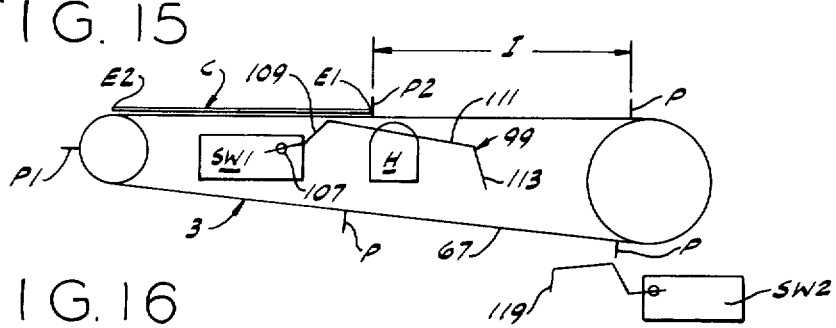
FIG. 15 is a semi-diagrammatic view based on FIG. 6 showing a card in the entry position.
Figure 16:
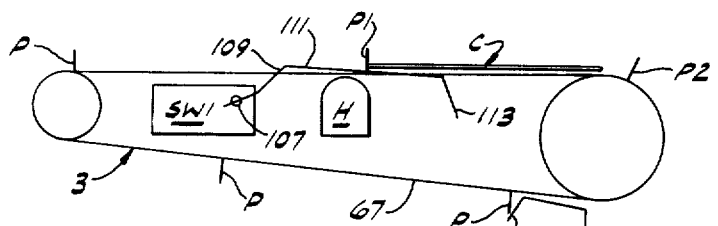
FIG. 16 is a view similar to FIG. 15 showing a card in a dwell position (which may also be referred to as the escrow position)

The validator V basically comprises means indicated generally at 1 for guiding a card for travel along a predetermined path, the card being movable forward in this guide means from a position of entry therein (shown in FIG. 15, and in phantom in FIG. 4), and the reader head H for reading the code on the card as it travels forward along said path from said entry position. The validator further comprising card transport means indicated generally at 3 comprising a plurality of pushers P of which a first P1 is movable forward from a starting position trailing the card in entry position (see FIG. 15) to a second position to engage the trailing end E2 of the card and push it forward from the entry position to a dwell or escrow position (see FIG. 16), and a second of which, designated P2, is movable forward along with the first from a starting position (see FIG. 15) leading the card in entry position to a second position (FIG. 16). Means indicated generally at 5 (FIG. 4) is provided for driving the card transport means in a forward direction for the first pusher P1 to push a card forward in the guide means from its entry position (FIG. 15) past the reader H to read the code on the card and deliver the card, if valid, to a second position, which may be more specifically termed the dwell or escrow position (FIG. 16), to dwell therein until the next operation of the driving means. The driving means is also adapted to drive the card transport means in the reverse direction for the second pusher P2 to push either a valid card or an invalid card (i.e., a card which is read to be invalid by the reader and associated reader circuitry) back in the guide means for return of the card to the person who has inserted the card. The pusher P1 which is in position at the trailing end E2 of a card (e.g., a valid card) in the dwell position (see FIG. 16) prevents the card from being pulled back out of the guide means (as may be attempted by attaching a string or tape to the card).

More particularly, the card guide means comprises means 7 (FIG. 4) defining a linear channel 9 adapted for endwise insertion of a card C at one end of the channel (its left end as viewed in FIGS. 1 and 4) and for endwise movement of the card through the channel from this end of the channel. This means comprises an elongate horizontal base plate 11 over which the card is slidable, side guides 13 and 15 for the card extending up from the plate 11 at opposite sides thereof, and a cover plate or lid 17 over the base plate bearing on the side guides, this cover being hinged at one side as indicated at 19 so that is may be swung down to a closed position on the side guides and swung up to open up the channel 9 (as for clearing a jam). Latches such as indicated at 21 are provided for latching the cover in closed position. The inside faces 13a and 15a of the side guides 13 and 15 extend parallel to one another spaced a distance slightly greater than the width of a card C. The side guides extend up above the upper face of the base plate 11 a distance slightly greater than the thickness of a card; thus the channel 9 defined by the plate 11, the side guides 13 and 15 and the closed cover plate 17 is slightly wider than a card, and has a depth (between the upper face of plate 11 and the lower face of the closed cover 17) slightly greater than the thickness of a card. The length of the plate 11 is somewhat greater than twice the length of a card. At the entrance end of the guide channel means 7 (its left end as viewed in FIGS. 1 and 3) a relatively short fixed cover section 23 is secured on top of the side guides 13 and 15. A card is adapted to be inserted endwise in the guide channel means 7 between this fixed cover section 23 and the plate 11 (and between the side guides) and pushed endwise into the channel 9. The fixed cover section 23 and the plate 11 are notched as indicated at 25 in FIGS. 3 and 4 to provide a finger notch extending forward from their entry and to enable an inserted card to be pushed in farther than the entry end of the plate 11 and fixed cover section 23 to the entry position of the card shown in FIGS. 4 and 15, wherein the trailing end E2 of the card generally at the forward end of the finger notch 25.

Figure 1:
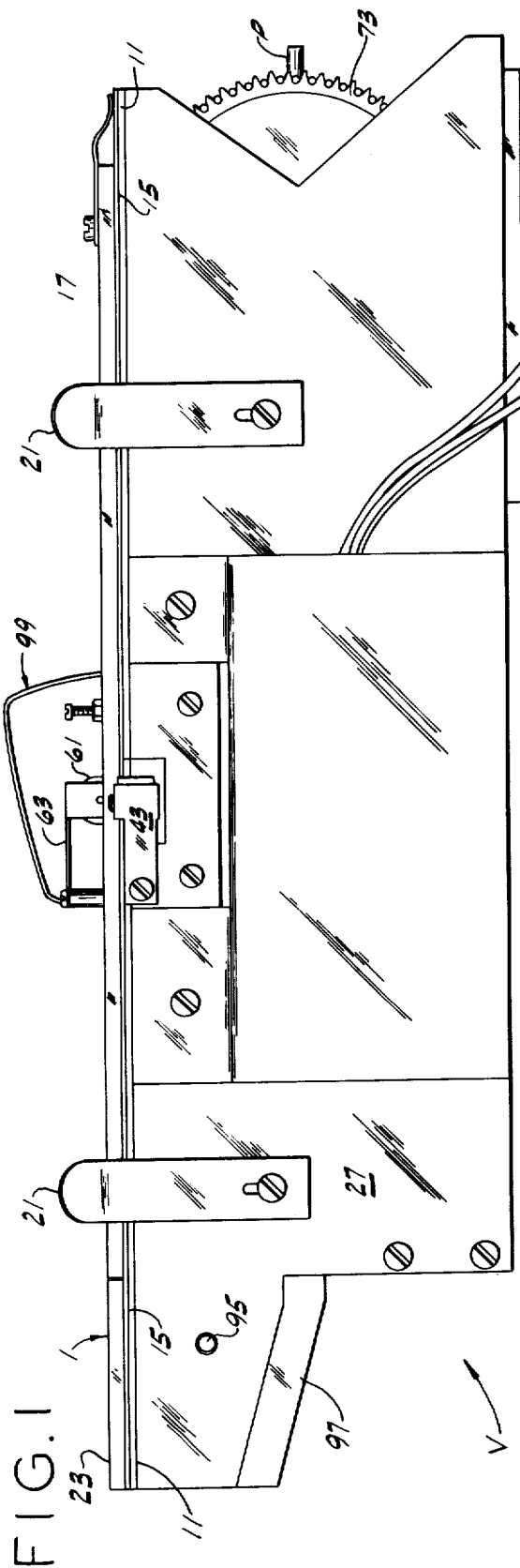
FIG. 1 is a view in elevation of one side of a validator of this invention.
Figure 3:
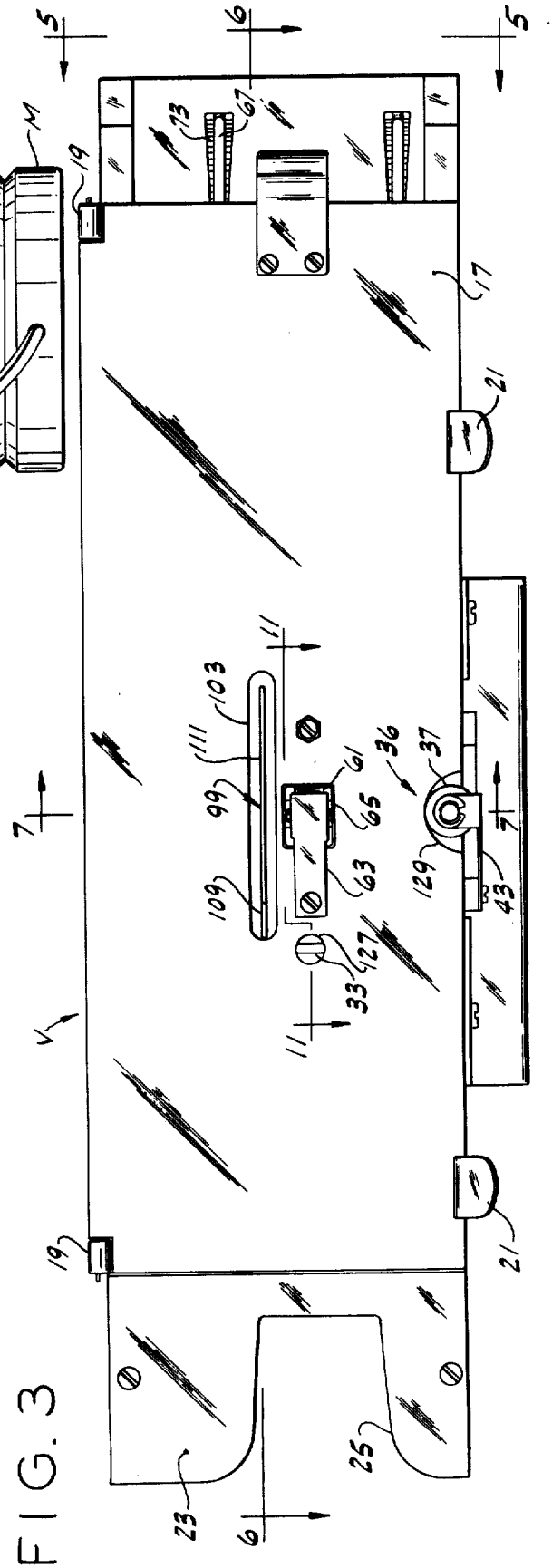
FIG. 3 is a plan of the validator showing it with a lid closed.
Figure 6:
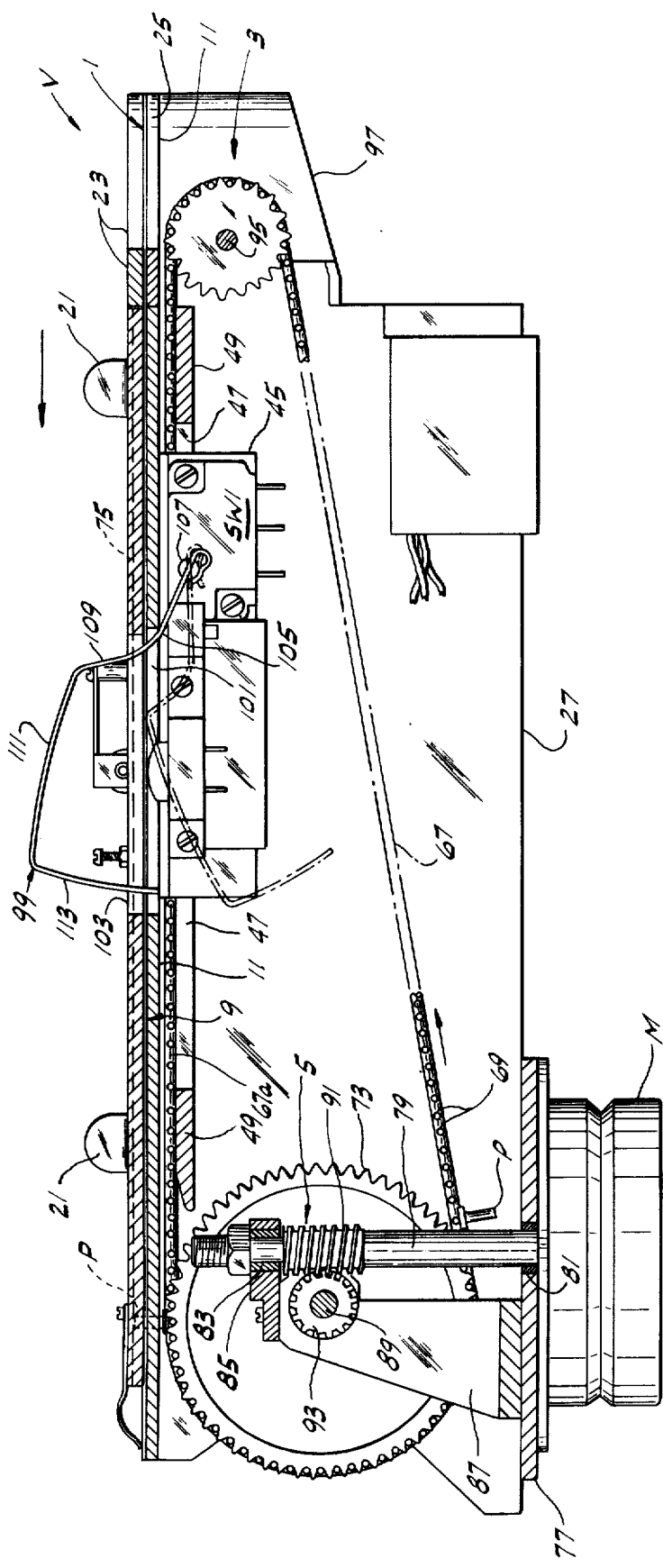
FIG. 6 is a vertical longitudinal section of the validator taken on line 6—6 of FIG. 3.

The guide plate 11 is mounted on a pair of vertical side plates 27 and 29. It is made of nonmagnetic material (e.g., aluminum) and has an opening 31 therein for a permanent magnet 33 for magnetizing the lines of the code. The cover 17 has an opening 34 at the location of the permanent magnet 33, which is located forward of (downstream from) the inner end of the finger notch 25 a distance somewhat less than the length of the card C (see FIG. 4) and is spaced transversely of the channel 9 a distance D from the inside face 13a of the side guide 13. The guide plate 11 also has an opening 35 therein for the magnetic head H, which is located forward of (downstream from) the permanent magnet 33 and somewhat forward of the forward (leading) end E1 of a card C in the entry position (FIG. 4) and in line with the permanent magnet at the distance D from the inside face 13a of the side guide 13. As a card C is fed forward through the channel 9 from its entry position (with the encoded face F1 of the card down) the code A first passes over the permanent magnet 33, which magnetizes it, and then, in its magnetized state, it passes over the magnetic head or reader H which generates an electrical output signal in accordance with the pattern of the code. For feeding of the card with the code accurately oriented with respect to the magnetic head H, i.e., with the lines L accurately at right angles to the direction of feed, the side guide 13 is precisely positioned to constitute a datum guide and means 36 is provided for biasing the card laterally against the guide. As shown in FIGS. 3 and 4, this means comprises a roller 37 engageable with the right side edge of a card via a gap 39 in the side guide 15 and a notch 41 in the side of the cover plate 17, the roller being mounted on a leaf spring 43.

The magnetic head H may be a mini-digital, relieved face, single-track read-only type of head having a 0.0001 inch gap with a track width of 0.057 inch. This head and the permanent magnet 33 are carried by a bracket 45 secured to the bottom of plate 11 and accommodated in a slot 47 (FIG. 7) in a bridge plate 49 spanning the side plates 27 and 29 below the plate 11. The head H has an upper rectangular horizontal face 51 for contact by the bottom face of the card, with an inclined ramp 53 leading up to this face, an inclined ramp 55 extending down from this face, and relieved areas 57 and 59 on opposite sides of this face. The roller 37 is located in the vertical transverse plane of the contact face 51 of the head to bias the card laterally against the guide 13 in this plane for accurate tracking of the card over the contact face 51. This face 51 is slightly elevated above the plane of the upper face of plate 11 for contact of the bottom face of the card as the card is pushed forward in the channel 9, firm contact being effected via a pressure roll 61 carried by a leaf spring 63 on the cover plate 17 operable through an opening 65 in the cover plate to press the card down against the contact face 51 of the head.

The card transport means comprises an endless conveyor having a series of the pushers P thereon spaced at equal intervals I along its length, the spacing being somewhat greater than the length of a card C. More particularly, the endless conveyor comprises a pair of endless belts each designated 67, which may be conventional timing belts with teeth 69 extending laterally at opposite sides thereof (FIGS. 8–10) trained around a pair of rearward sprockets each designated 71 and a pair of forward sprockets each designated 73 so located that the belts have an upper linear horizontal reach 67a extending longitudinally with respect to the channel 9 just below the plate 11 in the space between plates 11 and 49. The pushers P are constituted by pins extending outwardly from the belts, each pusher being constituted in effect by two pins, one on one belt and one on the other, located side-by-side in a plane transverse to the belts. Along the upper reach of the belts, the pins extend up through elongate narrow slots 74 in the base plate 11, projecting above the upper face of the base plate. The bridge plate 49 constitutes a backing plate for the upper reaches of the belts, preventing these reaches from flexing downwardly, and maintaining the pins P along the upper reach of the belt projecting above the upper face of the base plate 11. The pins project above the horizontal plane of the upper faces of the side guides 13 and 15, and the cover plate 17 has grooves 75 extending longitudinally in the bottom thereof from one end to the other receiving the pins.

The means 5 for driving the belts comprises a reversible electric motor M mounted on the bottom of a plate 77 (FIGS. 5 and 6) extending between the lower edges of the vertical side plates 27 and 29 adjacent the exit end of the validator having its output shaft 79 extending vertically upward through a hole 81 in the plate 77 and having its upper end journalled in a vertical bearing 83 in a head 85 at the top of a U-shaped support 87 on the plate 77. The forward sprockets 73 for the two belts 67 are secured on a horizontal shaft 89 journalled in this support 87 at its upper end, extending transversely of the validator. The motor shaft 79 has a worm 91 at its upper end in mesh with a worm gear 93 on the sprocket shaft 89 between the sides of the U-shaped support 87. The worm and worm gear are made such that the worm gear cannot drive the worm; hence they provide a drive from the motor M to the belts 67 which is irreversible from the belts back to the motor. Thus, the upper reaches 67a of the belts cannot be made to move rearwardly by exerting force in rearward direction on the pins P, although, by reversing the motor, the worm 91 will drive the worm gear 93, sprockets 73 and the belts 67 in a reverse direction. The rearward sprockets 71 (which are smaller than the forward sprockets) are secured on a horizontal shaft 95 extending transversely of the validator adjacent its entry end journalled in extensions 97 of the vertical side plates 27 and 29.

A first control switch SW1 for the motor M is mounted on the bracket 45 immediately rearward (FIG. 6) of permanent magnet 33. This switch has an operating arm constituted by a trip wire 99 normally extending up through an elongate narrow longitudinal slot 101 in the plate 11 and a corresponding slot 103 in the cover plate 17. The trip wire has a portion 105 extending forward from the operating shaft 107 of the switch, a shoulder portion 109 extending up from portion 105, an upper portion 111 extending forward from shoulder 109, and a forward end portion 113 extending back down from the upper reach. This switch is a conventional microswitch having means therein biasing the trip wire to swing upwardly to its raised solid line position of FIG. 6 wherein the shoulder 109 extends up through the slots 101 and 103 adjacent the rearward end of the slots. The shoulder 109 of the trip wire is spaced forward of the inner end of the finger notch 25 a distance somewhat less than the length of a card C (see FIG. 4) the arrangement thereby being such that, on insertion of a card in the guide channel means 1 between the fixed cover section 23 and the plate 11, and on pushing the card endwise into the channel 9 to the point where the rearward (trailing) end E2 of the card is generally at the forward end of the notch 25, the forward (leading) end E1 of the card engages the shoulder 109 of the trip wire 99 and swings the trip wire down (broken line position - FIG. 6) to actuate the switch SW1. The card is then fed forward by pins P on the endless belts 67, as will appear, and holds the trip wire 99 down to maintain the switch SW1 activated until the rearward (trailing) end E2 of the card passes off the forward end of the upper portion 111 of the trip wire, whereupon the trip wire swings up to its raised position to deactuate the switch.

Figure 12:
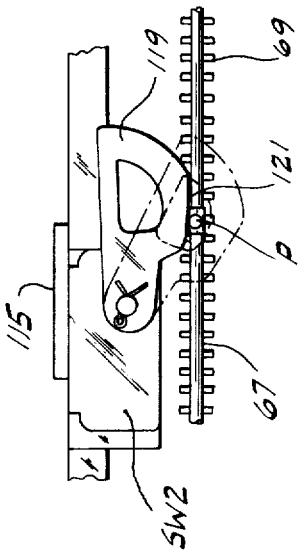
FIG. 12 is a view on line 12—12 of FIG. 2.

A second control switch SW2 (FIG. 2) for the motor is mounted on a bracket 115 carried by the left side plate 27 at the forward (exit) end of the validator adjacent the bottom of the left side plate 27 and just above the plate 77. The left side plate 27 has a notch 117 at its bottom forward corner, the bracket 115 being mounted in position at the top of this notch and the switch SW2 being mounted on the bottom of the bracket. The switch SW2 has an operating arm 119 on its bottom extending rearwardly on the inside of the left side wall 27 and having a cam edge 121 (FIG. 12) engageable by a pin P on the left-hand belt 67 as the pin comes down around the left-hand forward sprocket 73 and starts to move rearwardly on the lower (return) reach 67b of the left-hand belt. Switch SW2 is a conventional microswitch having means therein biasing the arm 119 to swing inward away from the left-hand side wall 27 to its retracted position, shown in phantom in FIG. 12, werein its cam edge 121 is in the path of the pin. The arrangement is such that as the pin P comes down around the left-hand forward sprocket 73 and starts to travel rearwardly with the lower return reach 67b of the left-hand belt 67, it engages the cam edge 121 of the arm 119 and swings it laterally outwardly to actuate the switch SW2 as shown in solid lines in FIG. 12. An inclined slot 123 in the left side wall 27 paralleling the left-hand belt accommodates the outward swing of the arm.

Figure 22A:
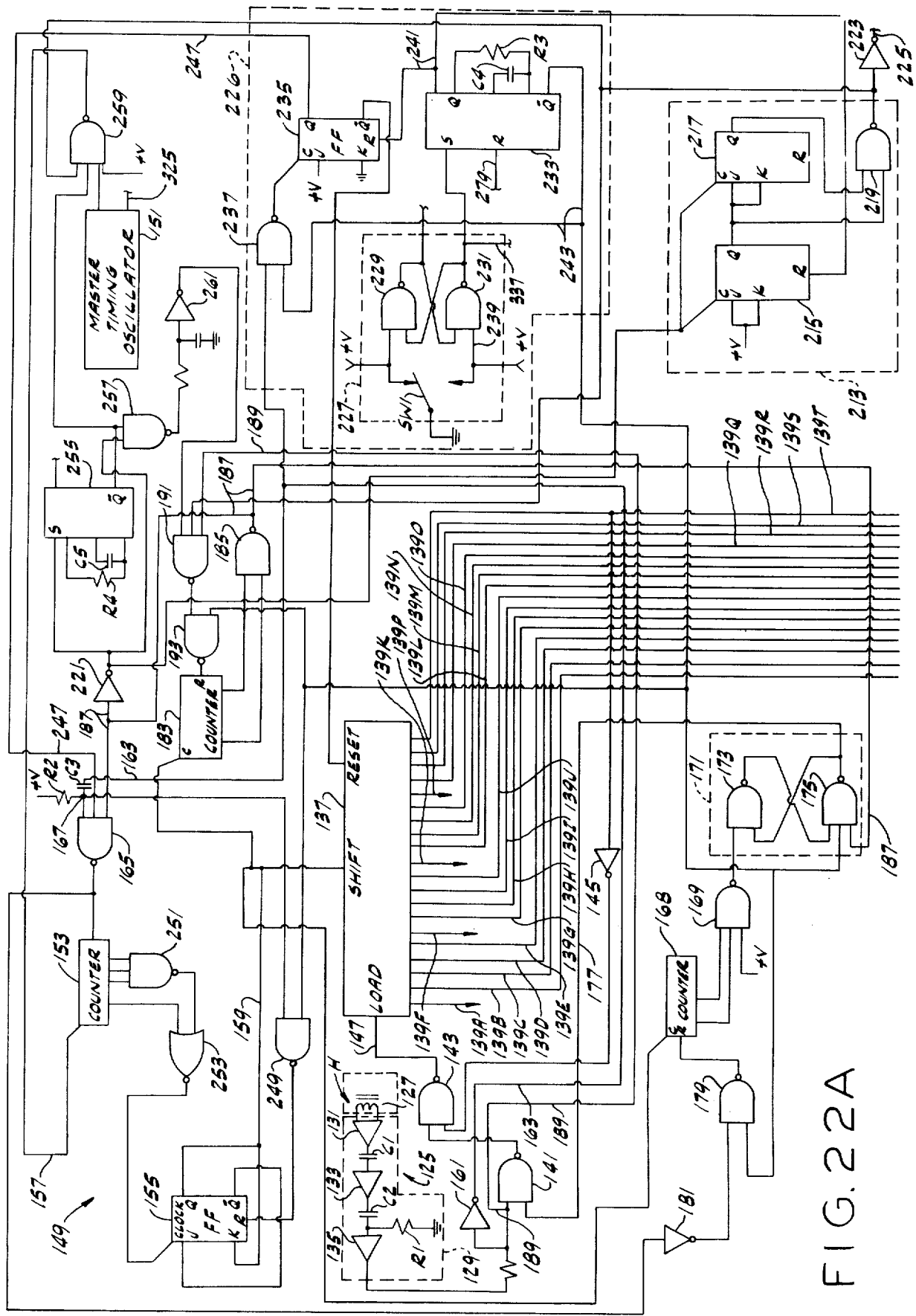
FIG. 22A is a circuit diagram showing part of the card validating circuitry for the validator.

Referring now to FIG. 22a, there is generally indicated at 125 a card reading means or reader which includes the aforesaid magnetic head H. This head includes a transducer 127, which may be one such as is commercially available from Nortronics Company, Incorporated, of Minneapolis, Minnesota, under this company's model designation DC-11P. The head is adapted to sense the two widths of lines L1 and L2 of the redundant encoded data blocks A1, A2 and A3, each of which lines represent one element of data in a block on card C. Transducer 127 supplies an electrical output signal having a sequence of first and second signal elements, each first signal element representative of a binary 1 which corresponds to a line L1 sensed by transducer 127 and each second signal element representative of a binary 0 which corresponds to a line L2 sensed by transducer 127. The sequence of first and second signal elements of the electrical signal corresponds to the sequence of lines L1 and L2 in a block of data on card C.

A three-stage preamplifier 129 amplifies and shapes the first and second signal elements of the electrical signal from transducer 127. The first stage of preamplifier 129 is an amplifier 131 which provides a voltage amplification of approximately 1000. The input voltage to amplfier 131 has, for example, a peak amplitude of approximately 0.2 millivolts and a peak output voltage amplitude of approximately 0.2 volts. An output signal from amplifier 131 is a-c coupled, by a capacitor C1, to the second stage of preamplifier 129 which is a differentiator that includes an operational amplifier 133, a capacitor C2 and a resistor R1. This second stage enhances the waveform of the electrical signal from transducer 127 to better distinguish first signal elements of the electrical signal from second signal elements. The third stage of preamplifier 129 includes an operational amplifier 135 functioning as a saturating threshold detector. Each first signal element of the differentiated signal waveform saturates operational amplifier 135 for a longer period of time than each second signal element. As a consequence, the output of preamplifier 129 is an electrical signal whose first signal elements each have a first predetermined time duration proportional to the width of each thicker line L1 sensed by transducer 127 and whose second signal elements each have a second and shorter predetermined time duration proportional to the width of each thinner line L2 sensed by transducer 127.

Permanent magnet 33, previously described, not only reinforces the strength of the lines L1 and L2 of magnetic material on card C but also erases magnetic images which may be positioned on a spurious or counterfeit card by means of a magnetic tape. Thus, blocks of data on these cards would not be sensed by read head H of transducer 127. Further, if a valid card C is so tampered with that lines L1 and L2 of magnetic material are less than a given length, as would occur if card C were cut lengthwise, the magnetic strength of lines L1 and L2 would be insufficient for such lines to be sensed.

Data from each block on card C is stored in a shift register 137 the contents of which are data bits representing binary 1's and 0's. Because each data block A1, A2 and A3 on card C contains, for example, twenty lines of magnetic material, each line representing one data element, register 137 has 20 stages. The contents of register 137, after a block of data on card C has been sensed by reader 125, is stored set of data. The data bit contents of each stage of register 137 are supplied on lines 139A through 139T, respectively, as outputs of the register.

The validity of card C is based upon the binary data derived from data blocks A1, A2 and A3. If card C validity is based only upon the data in a single block, damage to or the absence of a data element in that block may result in card C being rejected. Damage to a data element may, for example, result from prolonged card usage; e.g., a line of magnetic material being worn thin. The binary value of such data elements may thus be incorrectly sensed by reader 125 and incorrectly stored in register 137. Absence of a data element may, for example, also result from usage, e.g., a line is so worn as to be obliterated, or from scratching, or because of an error in card fabrication or printing in which case the line is never present. Such absences of data elements are corrected by providing pseudo-bits of data to be stored in register 137 as will be discussed. To increase, therefore, the probability of a valid, but worn, card being accepted, the data from each block on card C is preferably combined with the data from the outer blocks on the card to derive the best combination of data upon which validity is determined.

Register 137 has data bits loaded into its first stage, and the data bits so loaded are sequentially shifted through intermediate stages of the register to a final stage from which they are supplied as elements of an output signal from the final stage. Register 137 has its data bit contents set to binary zeroes prior to the sensing of the first block of data on card C by reader 125.

These initial data bit contents of register 137 may be thought of as representing a prior set of data with which data from block A1 on card C is combined to derive a resultant set of data which is stored in register 137. This stored or resultant set of data then becomes a prior set of data for combining with the data from the next block A2 on card C.

Elements of the electrical signal from reader 125 are supplied to one input of a NAND gate 141 the output of which is supplied to one input of a NAND gate 143. The other input to gate 141 is normally a logic high, so the logic output of gate 141 is normally a function of whether an element of the electrical signal is present at its one input. Elements of the output signal from register 137 are supplied on line 139T to an inverter 145 the output of which is supplied to the other input of gate 143. The logic output of gate 143 is a function of the logic inputs from gate 141 and inverter 145, and is therefore a function of the binary values represented by the signal element of the electrical signal and the signal element of the register 137 output signal. The output of gate 143 is supplied on line 147 to the load input of shift register 137. Inverter 145, and NAND gates 141 and 143 thus serve to combine each element of the electrical signal with an element of the output signal from register 137 to derive or produce one bit of the resultant set of data, the binary value of which is determined by the binary value of the signal elements combined.

A data controller 149 is responsive to elements of the electrical signal from reader 125 to supply shift signals to register 137 to load bits of data into the first stage of the register and shift data bits in the register. Data controller 149 includes a master timing oscillator 151, a counter 153 and a J-K flip-flop 155. Counter 153 responds to clock or timing pulses supplied on line 157 from oscillator 151 to continuously count from zero to a predetermined value which is, for example, 127 and then reset to zero. Counter 153 supplies a first signal at a first predetermined count value which is, for example, 44 and a second signal at a second predetermined count value which is, for example, 88 to the clock input of flip-flop 155. The first signal triggers flip-flop 155 to supply to a shift signal on line 159 to shift register 137 to load a data bit into the first stage of register 137 and shift data bits in the register. The second signal triggers flip-flop 155 to terminate the shift signal. The period between the time when counter 153 is reset to zero and the time it attains its first predetermined count value is shorter than the predetermined time duration of a first signal element of the electrical signal but longer than the predetermined time duration of a second signal element of the electrical signal.

Counter 153 is reset upon the occurrence of the leading edge of any element of the electrical signal, each element of which is an input to an inverter 161. The output of inverter 161 is supplied on line 163 to one input of a NAND gate 165, all the inputs to which are normally a logic high and the output of which is connected to the reset input of counter 153. A capacitor C3 is positioned in line 163 between the output of inverter 161 and a junction point 167 at which a logic high is supplied to gate 165 through a resistor R2. When the leading edge of any element of the electrical signal occurs, the input to inverter 161 is a logic high and its output a logic low. For this condition, junction point 167 is grounded, via capacitor C3, and the input to gate 165 on line 163 goes low, changing the logic output of gate 165 to a high which is supplied to the reset input of counter 153 resetting its contents to zero. This reset signal lasts only for a period determined by the time constant of resistor R2 and capacitor C3, which is, for example, five microseconds. After that time, capacitor C3 is sufficiently charged so that a logic high is again present at juction point 167.

As noted, the contents of counter 153 are reset at zero upon the occurrence of the leading edge of an element of the electrical signal. If, therefore, an element of data in a block on card C is missing and not sensed by reader 125, counter 153 is not reset by the occurrence of the leading edge of a signal element after it supplies a shift signal to register 137 and counter 153 automatically begins a new count cycle when its contents reach 127. When the contents of counter 153 again reach 44 a first signal is supplied to flip-flop 155 and a shift signal is supplied to register 137. Because the output of gate 143 is not now a data bit produced by combining signal elements of the electrical signal and the register 137 output signal, the bit of data at the load input to register 137 is a pseudo-bit of data having a binary value of 0. This pseudo-bit is loaded into register 137 and shifted through its intermediate stages in the same manner as all other data bits, thus keeping the relative position of data bits in register 137 in correspondence with the relative position of the elements of data in the block on card C sensed by reader 125.

Each shift signal supplied to register 137 is also supplied to a successive dropout counter 168 to increment the contents of counter 168 from zero to a preselected value equal to the maximum number of successive data elements in a block A on card C which reader 125 is unable to sense before gate 141 is inhibited from responding to elements of the electrical signal. If this number, which is, for example, three, is reached, data block A is considered too badly damaged to yield worthwhile data and data from it is not used in making a validity determination.

The contents of counter 168 are supplied to a NAND gate or decoder 169 whose output is supplied to one input of a flip-flop 171. Flip-flop 171 is constituted by two NAND gates 173 and 175. One input to gate 173 is the output of counter 168 and the output of gate 173 is one input to gate 175. The logic output of gate 175 which is normally a high is supplied to gate 173 and on line 177 to a second input of gate 141. Counter 168 is reset by a logic high from the output of a NAND gate 179 whenever data control counter 153 is reset by the occurrence of the leading edge of an element of the electrical signal from reader 125. The reset input to gate 179 is supplied by an inverter 181 whose input is supplied from the output of gate 165. If the contents of counter 168 reach the preselected count value before counter 168 is reset, decoder 169 supplies a signal to trigger flip-flop 171 and a logic low is supplied on line 177 to the input of gate 141. With a logic low input, the output of gate 141 is a logic high regardless of the input to gate 141 from reader 125 and gate 141 is, therefore, inhibited from responding to elements of the electrical signal if three successive elements in a data block are missing or are not sensed by reader 125.

Each shift signal supplied to register 137 is further supplied to a data bit counter 183 to increment the contents of count 183 from zero to a preselected value euqal the number of data elements contained in each block on card C. The contents of counter 183 are supplied to a NAND gate or decoder 185 whose output is supplied on line 187. Whenever the contents of counter 183 equal the number of data elements in a block on card C, e.g., twenty, a logic low is supplied on line 187 to gate 175 to reset flip-flop 171, and to an input of gate 165 to make the output of gate 165 a logic high and inhibit data control counter 153 from counting. The contents of shift register 137, when a logic low is supplied by gate 185, is a resultant set of data.

The leading edge of the element of the electrical signal which corresponds to the sensing by reader 125 of the first element of data in the next block on card C is supplied on line 189 to one input of a NAND gate 191 making all inputs to gate 191 high and its logic output low. The output of gate 191 is supplied to one input of a NAND gate 193 making the output of gate 193 to the reset input of counter 183 a logic high which resets the counter.

Figure 22B:
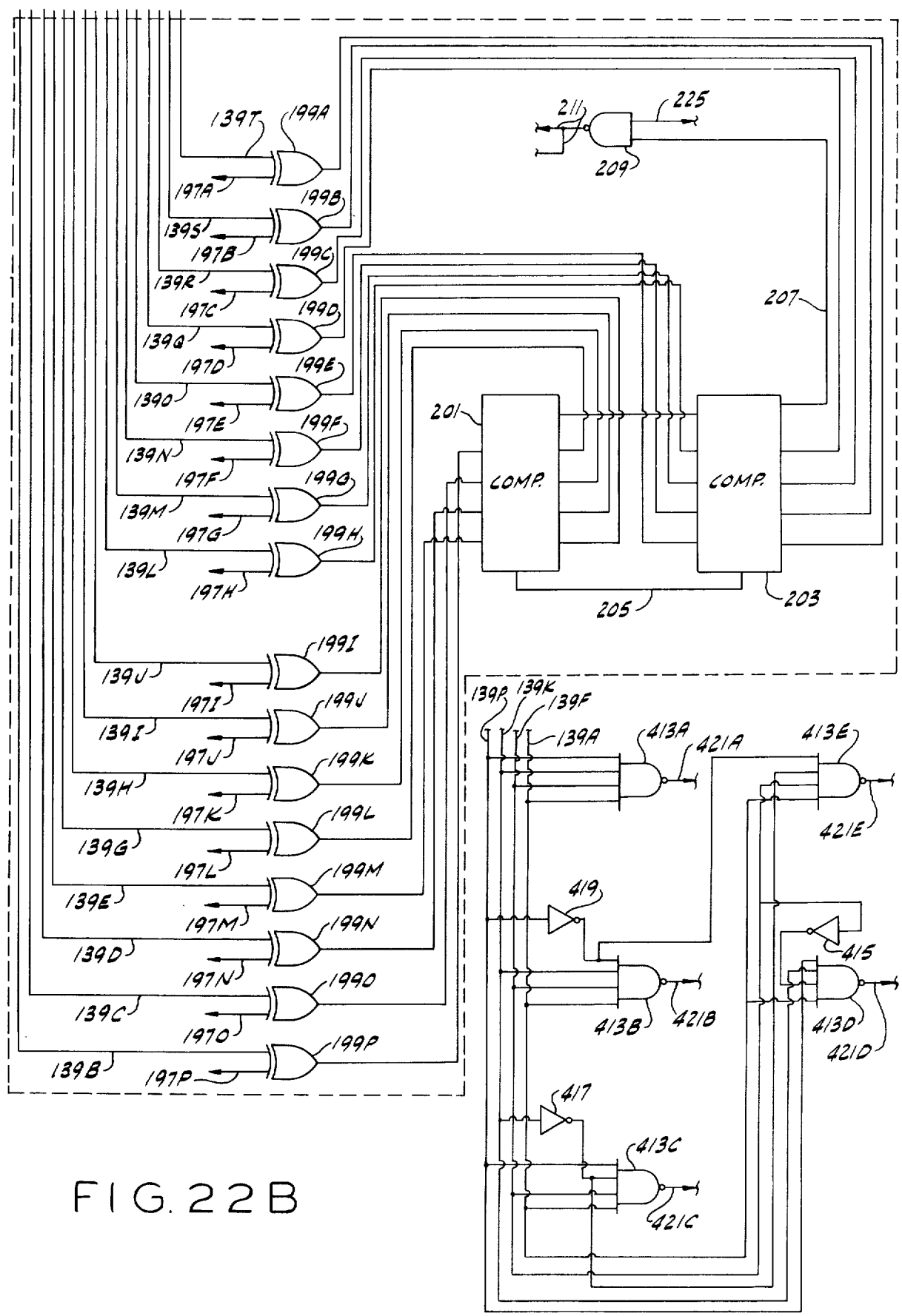
FIG. 22B is a continuation of FIG. 22A.
Figure 22C:
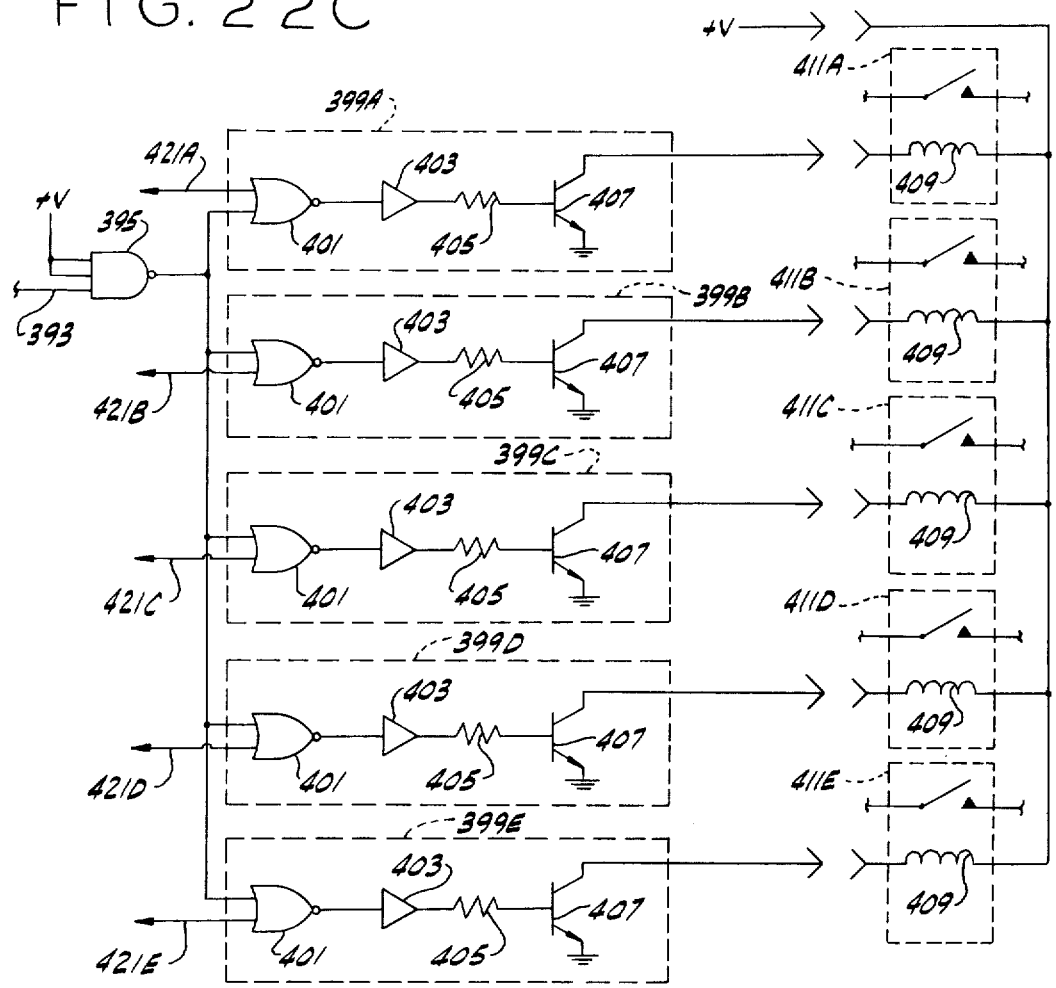
FIG. 22C is a continuation of FIG. 22B.
Figure 22D:
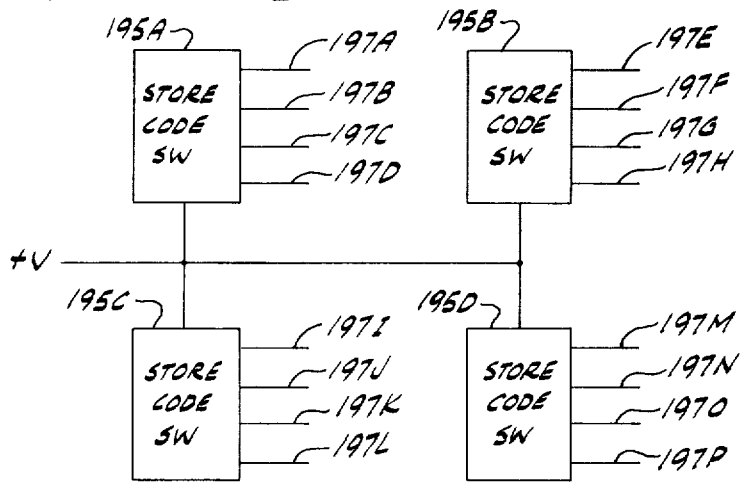
FIG. 22D is another continuation of FIG. 22B.

The stored or resultant set of data in register 137 is compared with a preselected set of data represented by data bits generated by four store code switches 195A through 195D, shown in FIG. 22D, the binary value of each data bit being determined by the setting of the respective switches. The data bit output of these switches is supplied on lines 197A through 197P to one input of Exclusive-Or gates 199A through 199P, shown in FIG. 22B. Data bits of the resultant set are taken from sixteen of the twenty stages of shift register 137 on lines 139B through 139E, 139G through 139J, 139L through 139O and 139Q through 139T. Data bits of the resultant set supplied on lines 139A, 139F, 139K and 139P are not used in the comparison but rather for determining the value represented by card C as will be discussed. The logic outputs of gates 199I through 199P are supplied as inputs to a comparator 201, and the logic outputs of gates 199A through 199H are supplied as inputs to a comparator 203. The logic output of comparator 201 is supplied on line 205 as an input to comparator 203. The logic output of comparator 205 is supplied on line 207.

In operation, if both inputs to an Exclusive-Or gate have the same binary value, the output of the gate is low, but if they do not, the output of the gate is high. Therefore, if the bit of the resultant set of data supplied as an input to each Exclusive-Or gate has the same binary value as the bit of the preselected set of data supplied as an input to the same gate, the output of all gates 199A through 199P is low. If all the inputs to comparator 201 are low, the output supplied by comparator 201 on line 205 is high. If all the inputs supplied to comparator 203 from gates 199A through 199H are low, and the input supplied by comparator 201 high, the logic output of comparator 203 on line 207 is high. A high on line 207 indicates that the resultant set of data is identical with the preselected set.

If the preselected and resultant sets of data are identical, it means that card C is valid and that an indication of card C validity should be given by a NAND gate 209 which has one input the logic output of comparator 203. The logic output of gate 209 supplied on line 211 provides the indication of card C validity. The output supplied by gate 209 is normally a logic high. If the gate 209 output goes low it indicates that card C is valid; if it does not, it indicates that card C is invalid.

In order to prevent card C from being rendered invalid for the reasons previously discussed and to prevent the use of counterfeit cards in validator V, for example a card having only one block of data, a data block counter 213, shown in FIG. 22A, inhibits gate 209 from supplying an indication of card validity until after all blocks of data on card C have been sensed by reader 125 and the resultant set of data derived from all blocks on card C has been compared with the preselected set of data.

Data block counter 213 includes a pair of J-K flip-flops 215 and 217, and a NAND gate or decoder 219. The J-K inputs of flip-flop 215 are always a logic high. The Q output of flip-flop 215 is supplied to both inputs of flip-flop 217 and to one input of gate 219. The Q output of flip-flop 217 is supplied to the other input of gate 219. Counter 213 counts from zero to a preselected value equal to the number of data blocks on card C, for example three. The contents of counter 213 are incremented by a signal supplied each time the contents of counter 183 equal the number of data elements in a block on card C. This signal is supplied by gate 185 through an inverter 221 to the clock input of flip-flops 215 and 217. The output of counter 213 is supplied to the input of an inverter 223 and the logic output of inverter 223 is supplied on line 225 to the second input of gate 209. Until all blocks of data on card C have been counted, the logic output of inverter 223 is a logic low which makes the logic output of gate 209 high regardless of the input to gate 209 on line 207. Thus, even though the logic output of comparator 203 goes high after only one or two of the data blocks on card C have been sensed, no indication of card validity is given.

When card C is first placed in the entry position to the predetermined path, the contents of shift register 137 are set to binary zeroes and counters 153, 168, 183 and 213 and flip-flops 155 and 171 are reset. These functions are performed by an initialization circuitry 226 which includes first control switch SW1, a first flip-flop or latching circuit 227 having NAND gates 229 and 231, a monostable multivibrator 233, a second flip-flop 235 and a NAND gate 237 one input to which is supplied by inverter 161.

Flip-flop 227 is responsive to the closing of first control switch SW1 when card C is placed in the entry position to the predetermined path for the input to gate 231 on line 239 to go low and the logic output of gate 231 high. This triggers multivibrator 233 making its normally low output on line 241 high, and its normally high output on line 243 low. A logic high on line 241 resets flip-flop 235 making its Q output a logic low and its $\overline{Q}$ output a logic high. A logic high is supplied by flip-flop 235 on line 245 to the reset input of shift register 137 setting the data bit contents of register 137 to binary zeroes. A logic low is supplied by flip-flop 235 on line 247 to gate 165 resulting in a logic high being supplied to the reset input of counter 153. The contents of counter 153 are set to zero and so long as a logic high remains at its reset input, counter 153 does not respond to pulses from oscillator 151 to increment its contents. The logic high on line 241 from multivibrator 233 is also supplied to the reset inputs of flip-flops 215 and 217 resetting the flip-flops and counter 213.

The logic low output of multivibrator 233 on line 243 causes the logic output of gate 193 to go high resetting the contents of data bit counter 183 to zero. Similarly, the logic output of gate 179 goes high resetting the contents of successive drop-out counter 168 to zero. The logic low on line 243 is further supplied to one input of a NAND gate 249. The logic output of gate 249 is supplied to the reset input of flip-flop 155. With a logic low input, the logic output of gate 249 is high, resetting flip-flop 155 and making its Q output low and its $\overline{Q}$ output high. Lastly, a low on line 243 to gate 175 of flip-flop 171 causes the logic output of flip-flop 171 on line 177 to go high which is the input condition to gate 141 necessary for gate 141 to respond to elements of the electrical signal from reader 125.

At the end of a period determined by the values of a resistor R3 and a capacitor C4, which is approximately 350 microseconds, multivibrator 233 resets. When this occurs, card C has traveled about 75% of the distance on the predetermined path between the entry position and the position of read head H. The logic low supplied at the Q output of flip-flop 235 to gate 165 continues to prevent data control counter 153 from responding to timing pulses supplied by oscillator 151 and the contents of counter 153 remain at zero. Data control counter 153 is thus prevented from causing the initiation of any shift signals by flip-flop 155. Without shift signals being supplied to register 137, no data bits are loaded into its first stage and register 137 is therefore unresponsive to noise signals generated by the actuation and deactuation of first and second control switches SW1 and SW2 and by internal switching which occurs within preamplifier 129.

When the leading edge of the first element of the electrical signal occurs at the input to inverter 161, the logic output of inverter 161 goes low. Prior to this, both inputs to gate 237 were high and its output low. Now with a low input to gate 237 from inverter 161, the logic output of gate 237 goes high triggering flip-flop 235 and making its Q output on line 247 high and its $\overline{Q}$ output on line 245 low. All inputs to gate 165 are now high and data control counter 153 responds to timing pulses from oscillator 151. Flip-flop 235 has its J input always a logic high and its K input always a logic low. As a result, flip-flop 235 is unresponsive to any further logic high inputs from gate 237.

When the data bit contents of register 137 are initialized to binary zeroes, the data bit in the last stage of register 137 is supplied as an input to inverter 145. A binary zero is equivalent to a logic low and therefore the logic output of inverter 145 to gate 143 is high. The input to gate 141 from reader 125 is high so long as an element of the electrical signal is present. With the other input to gate 141 high, the output of gate 141 is low. The inputs to gate 143 are thus low and high and the output of gate 143 to the load input of register 137 is high.

Data control counter 153, as noted, counts from 0 to 127 and a NAND gate 251 and a NOR gate 253, acting as decoders, supply a logic high to the clock input of flip-flop 155 when the value of the contents of counter 153 are 44 and 88. The Q output of flip-flop 155 is supplied to the K input of the flip-flop and the $\overline{Q}$ output to the J input. With flip-flop 155 reset, its J input is high and its K input low. Thus, the logic high to the clock input of flip-flop 155 which occurs at count value 44, triggers flip-flop 155 making its Q output high and initiating a shift signal. The supplying of a shift signal to register 137 loads the output of gate 143 into the first stage of register 137 as a data bit and shifts data bits through intermediate stages of the register.

The binary value of the data bit loaded into register 137 is initially determined by whether a first or a second element of the electrical signal is present at the input to gate 141. Oscillator 151 has a pulse repetition rate proportional to the speed with which card C is moved forward along the predetermined path, this rate being approximately 454KHZ. At this rate, the predetermined time duration of a first element of the electrical signal lasts until the contents of counter 153 is approximately 96 while the predetermined time duration of a second signal element lasts only until the contents of the counter is approximately 32. Therefore, if a first signal element is supplied to gate 141, it is still present when the shift signal from flip-flop 155 is initiated and the output of gate 143 to the load input of shift register 137 is still high. This results in a data bit having a binary value of 1 being loaded into the shift register. If, however, a second signal element is supplied to gate 141, it is no longer present when the shift signal from flip-flop 155 is initiated and the logic output of gate 143 is low. This results in a data bit having a binary value of 0 being loaded into the first stage of reader 137. This latter result also occurs if reader 125 is unable to sense a data element in block A1 on card C because the element is absent. Therefore, as previously noted, the inability of reader 125 to sense an element of data results in a pseudo-bit having a binary value of 0 being initially stored in register 137.

When count value 88 is reached by counter 153, a second high is supplied to the clock input of flip-flop 155. Now, the J input of flip-flop 155 is low and its K input high. Flip-flop 155 is again triggered and its Q output goes low terminating the shift signal. The shift signal, besides causing register 137 to load and shift data bits, is also supplied to data bit counter 183 to increment its contents, and to successive dropout counter 168 to increment its contents.

The leading edge of the next element of the electrical signal causes counter 153 to be reset in the manner previously discussed. The reset signal to counter 153 is also supplied to inverter 181 and results in successive drop-out counter 168 also being reset. The momentary logic low at junction point 167 is supplied to a second input of gate 249 causing its output to go high, resetting flip-flop 155.

With each shift signal supplied on line 159, the contents of data bit counter 183 are increased by one. When the value of these contents equal twenty, both inputs to gate 185 are high and the logic output of gate 185 goes low. This low is supplied on line 187 to gate 165 making the output of gate 165 high and inhibiting data control counter 153 from responding to timing pulses. The logic low from counter 183 is supplied to inverter 221 and the logic high output of inverter 221 is supplied to the clock input of both flip-flops 215 and 217. With flip-flops 215 and 217 reset the Q output of each is low and a logic high to the clock input of the flip-flops triggers both. Because the inputs of flip-flop 215 are both high, the output of flip-flop 215 goes high. However, because both inputs to flip-flop 217 are low, its output remains low and the inputs to gate 219 are thus high and low. The logic output of gate 219 is high and the output of inverter 223 low. The low output supplied by inverter 223 inhibits gate 209 from responding to a logic high supplied on line 207 by comparator 203 which would occur if the data from block A1 on card C were identical with the preselected set of data.

The logic high output of inverter 221 is also supplied to a monostable multivibrator 255 triggering the multivibrator and making its $\overline{Q}$ output low for a period determined by a resistor R4 and a capacitor C5. After this period, which is approximately 1 millisecond, the $\overline{Q}$ output of multivibrator 255 again goes high. The $\overline{Q}$ output of multivibrator 255 is supplied to one input of a NAND gate 257 and to an input of a NAND gate 259. So long as any input to gate 259 is low, gate 259 blocks the output of oscillator 151 and no timing pulses are supplied on line 157 to counter 153. This prevents a response to any noise occurring between the sensing of the last element of data in one block on card C and the sensing of the first element of data in the next block.

The logic output of inverter 221 is supplied to a second input of gate 257 and the logic output of gate 257 is supplied to an inverter 261. The output of inverter 261 is supplied to a second input of gate 191. A third input to gate 191 are elements of the electrical signal which are supplied on line 189. When the $\overline{Q}$ output of multivibrator 255 goes high, the logic output of gate 257 goes low. This is inverted to a high by inverter 261 and supplied to gate 191. The input to gate 191 from data block counter 213 is also high, since only one block of data on card C has been counted, but the input to gate 191 on line 189 is low because no element of the electrical signal is present. When the leading edge of the next signal element occurs, indicating that the first element of data in the next block on card C has been sensed, all inputs to gate 191 are high and its output goes low. This produces a logic high from gate 193 and causes the contents of data bit counter 183 to be reset to zero. When counter 183 resets, both inputs to gate 185 go low making its output high. All inputs to gate 165 are again high and the output of gate 165 goes low enabling data control counter 153 to respond to timing pulses.

The data from the second and third blocks A2 and A3 on card C are combined with the resultant or stored data bits in shift register 137 in a manner similar to that previously discussed. Now, however, if the binary value of an element of the output signal from register 137 is 1, which represents a logic high, the logic output of inverter 145 to the input of gate 143 is low. With a low input, the logic output of gate 143 remains high regardless of whether a first or second or no signal element of the electrical signal is supplied to the input of gate 141. Thus, a data bit with a binary value of 1 is loaded into register 137. Therefore, a data bit stored in register 137 can have its binary value changed from 0 to 1 as the result of combining the contents of register 137 with data from a subsequent block on card C, but once a data bit derived through the combining process is stored in register 137 with a binary value of 1, its value cannot thereafter be changed to a binary 0.

After data block A2 on card C has been sensed, the output of data bit counter 183 again goes low and flip-flops 215 and 217 are again triggered. The Q output of flip-flop 215 goes from high to low and because both inputs to flip-flop 217 are high the Q output of flip-flop 217 goes high. Gate 219 still has high and low inputs and its output remains high while the output of inverter 223 remains low thus keeping gate 209 inhibited.

After data block A3 on Card C has been sensed, flip-flops 215 and 217 are again triggered. The Q output of flip-flop 215 goes high while the Q output of flip-flop 217 remains high. Gate 219 now has both inputs high making its output low. A low from counter 213 inhibits gate 259 from supplying timing pulses produced by oscillator 151 and inhibits gate 191 so that data bit counter 183 can no longer be reset. The logic low from data block counter 213 is inverted by inverter 223 making its output supplied on line 225 to the input of gate 209 high. With this input to gate 209 now high, the logic output of gate 209 goes low if the output of comparator 203 is high indicating that the preselected and resultant sets of data are identical and that card C is valid.

Figure 23:
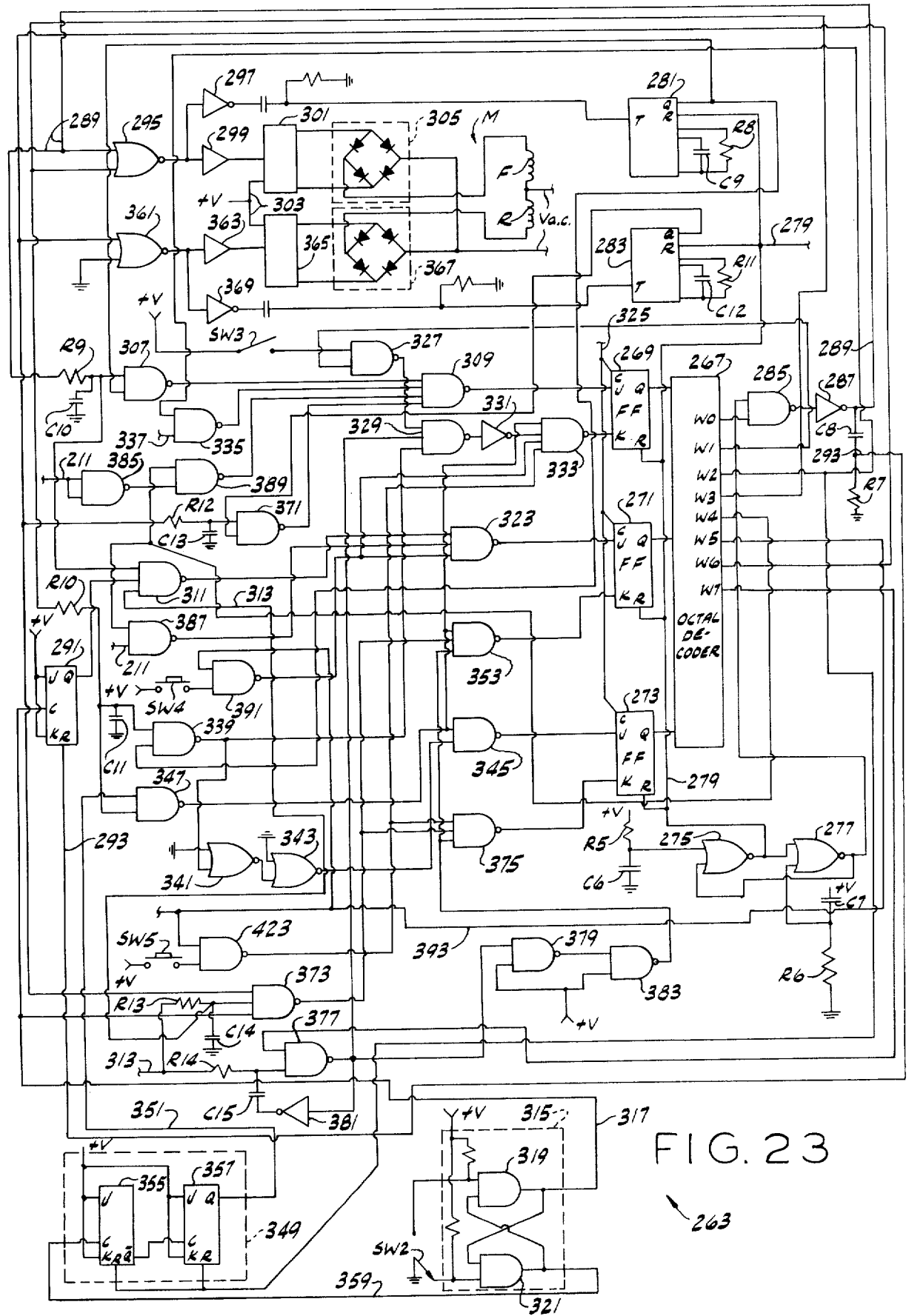
FIG. 23 is a circuit diagram showing the drive control circuitry for the validator.

The control for drive means 5 is indicated generally at 263 in FIG. 23. As will be discussed, drive control 263 is responsive to the positioning of card C in the entry position to the predetermined path to actuate drive means 5 to move card C forward along the path. It is also responsive to card C reaching the dwell position on the path to deactuate drive means 5. Finally, it is responsive to a validity indication to temporarily maintain drive means 5 deactuated with card C retained at the dwell position. If no indication of card validity is supplied to drive control 263, drive means 5 is actuated to immediately return card C along the predetermined path from the dwell position to the entry position.

Drive control 263 includes an octal decoder 267 having eight outputs and three J-K flip-flops 269, 271 and 273. Octal decoder 267 supplies a signal at each of its eight outputs that is either a logic high or low. The logic output of each flip-flop 269, 271 and 273 is also a signal having one of two logic levels, and these are supplied to octal decoder 267. Octal decoder 267 is responsive to these signals to supply a signal at one of its eight outputs that is logic high while supplying a logic low at its other seven outputs. For convenience, drive control 263 is referred to as being in one of eight operating states W0 through W7, the operating state indicating at which of its eight outputs octal decoder 267 is supplying the logic high signal. Thus, state W0 refers to when the logic high is supplied at the first output of octal decoder 267, W1 the second output and so on.

State W0 is initially created when power is applied to drive control 263. At power-up, a d.c. voltage is applied across a resistor R5 and a capacitor C6 and across a resistor R6 and a capacitor C7. Voltage applied to the capacitor C6-resistor R5 network is supplied to a first input of a NOR gate 275 whose logic output is supplied to a first input of a NOR gate 277. Voltage applied to the capacitor C7-resistor R6 network is supplied to the other input of gate 277. The logic output of gate 275 is supplied on line 279 to the reset input of each of the flip-flops 269, 271 and 273, to the reset input of monostable multivibrators 281 and 283 and to the reset input of multivibrator 233 shown in FIG. 22A. The logic output of gate 277 is supplied to one input of a NAND gate 285 whose other input is supplied by octal decoder 267 at its first output. The output of gate 285 is inverted by an inverter 287 and supplied as the first output of octal decoder 267 on line 289. The output of inverter 289 is further supplied to the reset input of a J-K flip-flop 291.

When power is initially applied, capacitors C6 and C7 act as shorts and the first input to gate 275 is low, while the first input to gate 277 is high. With a high input, the output of gate 277 is low to both gate 275 and gate 285. NOR gate 275 thus has both inputs low and supplies a logic high on line 279 to the reset inputs of flip-flops 269, 271 and 273 and multivibrators 233, 281 and 283. Flip-flops 269, 271 and 273 are reset by this logic high and their outputs to octal decoder 267 are logic lows resulting in octal decoder 267 supplying a high to gate 285. Gate 285 has a high and a low input, and supplies a high to inverter 287 which is inverted to a logic low and supplied on line 289. This logic low prevents drive control 263 from attaining state W0 and insures that operations initiated by drive control 263 don't commence until after the power supplies (not shown) which power drive control 263 stabilize at their proper operating voltage levels.

After a period determined by the time constant of resistor R5 and capacitor C6, which is approximately one-half second, the first input to gate 275 goes high and the output of gate 275 low. A low input to gate 277 makes its output high. Both inputs to gate 285 are now high and its logic low output is inverted by inverter 287 to a high which is supplied on line 289. State W0 is created when this occurs. When the output supplied by inverter 287 goes high, a capacitor C8, acting as short, allows the high to be supplied on line 293 to the reset input of flip-flop 291. After a period determined by the time constant of a resistor R7 and capacitor C8, which is approximately twenty microseconds, the logic level on line 293 goes from high to low and the reset signal is terminated.

When state W0 is created motor M of drive means 5 is actuated to drive belts 67 in a forward direction until the starting position of card transport means 3 is reached. This is the position where a first pair of pushers P on belts 67 trail the back or trailing edge E2 of a card C in the entry position and a second pair of pushers P2 on the belts lead card C in the entry position.

Actuation of drive means 5 is accomplished by the first of three circuits responsive to a logic high at the first output of octal decoder 267. This first circuit includes a NOR gate 295 having an input supplied by octal decoder 267 on line 289. The logic output of gate 295 is supplied to an inverter 297 and an amplifier 299 which serves as a power driver for a photon-coupled silicon-controlled rectifier (SCR) circuit 301. The output of inverter 297 is supplied to the input of multivibrator 281. Photon-coupled SCR circuit 301, which is commercially available from the General Electric Company of Schenectady, New York, under their model designation "H11C2", includes a light-emitting diode (LED) which is lit when the logic output of gate 295 goes low because a ground path is then provided through the LED and power driver 299 for a d.c. voltage supplied to circuit 301 on line 303. When the LED is lit, the SCR in circuit 301 conducts and a path is completed through a full-wave rectifier 305 so that a.c. voltage is applied to a coil F of reversible electric motor M, energizing motor M to drive belts 67 forward. Simultaneous with the energization of motor M, multivibrator 281 is triggered by the output of inverter 297. When triggered, the normally high output of multivibrator 281 goes low for the period determined by a resistor R8 and a capacitor C9, which is approximately one second, after which the output of multivibrator 281 goes high.

The logic output of multivibrator 281 is supplied to one input of a NAND gate 307 which is included in the second of the three circuits responsive to the logic high at the first output of octal decoder 267. When the logic output supplied by octal decoder 267 on line 289 goes high, a capacitor C10 delays its application to a second input of gate 307 for a period determined by the time constant of a resistor R9 and capacitor C10, which period is approximately 2 microseconds. This delay insures that the logic high output of octal decoder 267 is not supplied to gate 307 until the other logic input to gate 307, the output of multivibrator 281, has gone low. This prevents drive control 263 from being placed in an incorrect state of operation. Other resistor-capacitor combinations, as will be noted, perform similar functions within drive control 263. The logic output of gate 307 is supplied to one input of a NAND gate 309 whose logic output is supplied to the J input of flip-flop 269.

The third circuit responsive to a logic high at the first output of octal decoder 267 includes a NAND gate 311 whose other inputs include the logic output supplied by flip-flop 291, and the output supplied on line 313 by flip-flop or latching circuit 227 shown in FIG. 22A. Flip-flop 291 has its J and K inputs high and derives its clock input from the logic output supplied by a flip-flop or latching circuit 315 on line 317. Latching circuit 315 includes NAND circuit 319 and 321, each having as one input the output of the other. The other input to each gate is always high unless the actuation or deactuation of second control switch SW2 provides a path to ground for this input. With no card C in the entry position to the predetermined path, first control switch SW1 is deactuated and the logic output of latching circuit 227 on line 313 is high. Because flip-flop 291 is reset when state W0 is attained, the logic output of flip-flop 291 is low regardless of the status of second control switch SW2. The output of gate 311 is supplied to one input of a NAND gate 323 whose logic output is supplied to the J input of flip-flop 271.

As belts 67 are driven in the forward direction, a pusher P on left-hand belt 67 engages cam edge 121 of operating arm 119 of switch SW2 and pushes it laterally outward to actuate the switch. Upon actuation of switch SW2, the output supplied by latching circuit 315 on line 317 goes high. Flip-flop 291 is triggered and its logic output goes high. All inputs to gate 311 are now high and its logic output goes low. A logic low at any input of gate 323 causes its logic output to go high making the J input to flip-flop 271 high. When a high appears at the J or K input of flip-flops 269, 271 or 273, the next clock or timing pulse supplied by oscillator 151 on line 325 to the clock input of each flip-flop triggers the respective flip-flop. Because flip-flop 271 was earlier reset, its logic output to octal decoder 267 is low. When flip-flop 271 is now triggered, its logic output goes high and the logic inputs to octal decoder 267 are high from flip-flop 271 and low from flip-flops 269 and 273. With this combination of inputs, octal decoder 267 terminates the logic high at its first output and supplies a logic high at its third output. This creates state W2 and indicates that card transport means 3 and drive means 5 are functioning properly.

The termination of the high at the first output of octal decoder 267 makes the input to gate 295 on line 289 low and consequently the input to photon-coupled SCR circuit 301 high. The SCR in circuit 301 ceases conduction and a.c. voltage is removed from coil F. Motor M is deenergized and the driving of belts 67 stop. Further, the input to gate 307 goes low keeping the output of gate 307 high even when the output of multivibrator 281 goes high. All inputs to gate 309 are normally high and its logic output to the J input of flip-flop 269 low. Therefore, the elapse of the one-second period established by multivibrator 281 has no effect on the logic inputs to octal decoder 267.

If the logic output of multivibrator 281 goes high before second control switch SW2 is actuated, it indicates a problem either with drive means 5 or card transport means 3. When the output of multivibrator 281 goes high, both inputs to gate 307 are high and its output goes low to the input of gate 309. A low input to gate 309 makes its logic output high to the J input of flip-flop 269. When flip-flop 269 is triggered its logic output goes high, making the inputs to octal decoder 267 high from flip-flop 269 and low from flip-flops 271 and 273. Octal decoder 267 terminates the logic high at its first output and supplies a logic high at its second output thereby creating state W1. As before, the termination of the high at the first output of octal decoder 267 results in the removal of power from motor M and stops the driving of belts 67. State W2 precludes any further actuation of motor M by drive control 263 because further energization of motor M can only occur when state W3 or state W6 is created and neither of these states can be created from state W1. By shutting down, in effect, drive control 263 damage to drive means 5 and card transport means 3 is prevented, particularly burnout of motor M which may occur if drive control 263 were left in state W0 where motor M continues to run.

When state W1 is created, the logic high at the second output of octal decoder 267 is supplied to one input of a NAND gate 327. The output of gate 327 is supplied to one input of a NAND gate 329 whose logic output is supplied to the input of an inverter 331. The logic output of inverter 331 is supplied to one input of a NAND gate 333 and the logic output of gate 333 is supplied to the K input of flip-flop 269. The other input to gate 327 is a logic high supplied through a manual reset switch SW3. Until manual reset switch SW3 is closed, the second input to gate 327 is low and the logic output of gate 327 is high. Because all inputs to gate 329 are normally high, the logic output of gate 329 is low and is inverted by inverter 331 to a high which is supplied to gate 333. The other inputs to gate 333 are also normally high and the logic output supplied to the K input of flip-flop 269 is low. Since state W1 indicates trouble with either drive means 5 or card transport means 3, manual reset switch SW3 is not actuated until the trouble is located and corrected. Actuation of switch SW3 causes a logic high to be supplied to gate 327 making both its inputs high and its output low. A low input to gate 329 makes its output high, which is inverted by inverter 331 to a logic low and supplied to gate 333. A low input to gate 333 makes its logic output to the K input of flip-flop 269 high and when flip-flop 269 is triggered its logic output goes low. All inputs to octal decoder 267 are again low and state W0 is recreated. The creation of state W0 again causes energization of motor M to drive belts 67 to their starting position and if this is successfully accomplished within the 1-second time interval establishing by multivibrator 281 state W2 is created as before described.

Once state W2 is created, drive control 263 remains in that state until a card C is placed in the entry position to the predetermined path. In state W2, the logic high at the third output of octal decoder 267 is supplied to one input of a NAND gate 335. The other input to gate 335 is supplied on line 337 from the output of latching circuit 227. With no card C in the entry position, the output of latching circuit 227 on line 337 is low and the logic output of gate 335 is high. The output of gate 335 is supplied to a second input of gate 309.

When a card C is inserted into validator V, first control witch SW1 is actuated. The output of latching circuit 227 on line 337 goes high making both inputs to gate 335 high. The logic output of gate 335 to the input of gate 309 goes low changing the output of gate 309 to high. With a high at its J input, flip-flop 269 is triggered and its output to octal decoder 267 goes high. Octal decoder 267 now has high inputs from flip-flops 269 and 271 and a low input from flip-flop 273. With these inputs, octal decoder 267 terminates the logic high at its third output and supplies a logic high at its fourth and state W3 is created.

Creation of state W3 causes a.c. power to be applied again to coil F of motor M and belts 67 are driven to move card C forward along the path from the entry position to the dwell position this being accomplished by the pair of pushers P1 on belts 67 engaging end E2 of card C and pushing the card forward. This occurs because the logic high at the fourth output of octal decoder 267 is supplied to a second input of gate 295 making the logic output of gate 295 low. As before, multivibrator 281 is triggered simultaneously with the energization of motor M and the logic output of multivibrator 281 goes low.

Also responsive to the high at the fourth output of octal decoder 267 is a NAND gate 339 having as one input the logic high from the fourth output of octal decoder 267 and as a second input the logic output of multivibrator 281. A resistor R10 and a capacitor C11, as previously discussed, prevent application of the logic high from octal decoder 267 to gate 339 until the logic output of multivibrator 281 goes low. Again, this prevents drive control 263 from being placed in an improper operating mode. The logic output of gate 339 is supplied to a second input of gate 329 and to one input of a NOR gate 341. The output of gate 341 is supplied to one input of a NOR gate 343. A second input to gates 341 and 343 is always a logic low. The output of gate 343 is supplied to one input of a NAND gate 345 whose logic output is supplied to the J input of flip-flop 273. NOR gates 341 and 343 serve as time delays so that a change in the logic output of gate 343 is supplied to the input of gate 345 simultaneously with a change in the output of gate 339 being supplied to the input of gate 333 through gate 329 and inverter 331. This time delay prevents improper operating modes of control 263 from being created.

Further responsive to the high at the fourth output of octal decoder 267 is a NAND gate 347 having as one input the output of octal decoder 267 and as its other input the logic output of a counter 349 on line 351. The output of gate 347 is supplied to a second input of gate 345, to one input of a NAND gate 353, and to a second input of gate 333. The logic output of gate 353 is supplied to the K input of flip-flop 271. Counter 349 includes J-K flip-flops 355 and 357, the J and K inputs of each flip-flop being a logic high. The $\overline{Q}$ output of flip-flop 355 is supplied to the clock input of flip-flop 357. The Q output of flip-flop 357 is the logic output of counter 349. Counter 349 is reset by a logic high from the third output of octal decoder 267 when drive control 263 is in state W2 so the $\overline{Q}$ output of flip-flop 355 is high while the Q output of flip-flop 357 is low. The logic input to counter 349 is the output supplied by latching circuit 315 on line 359 to the clock input of flip-flop 355. The logic output supplied by circuit 315 on line 359 is high when switch SW2 is deactuated and low when switch SW2 is actuated. When state W2 was created, switch SW2 was closed and therefore the input to counter 349 is low when state W3 is created. This makes the output supplied by counter 349 on line 351 low.

In the movement of card C forward along the predetermined path from the entry position to the dwell position, switch SW2 is deactuated, actuated and deactuated again. If the second deactuation of switch SW2 occurs prior to the logic output of multivibrator 281 going high, state W4 is created. If the second deactuation of switch SW2 does not occur before the logic output of multivibrator 281 goes high, state W6 is created and coil R of motor M is energized to drive belts 67 to return card C back along the path past the entry position to a position shown in FIG. 18.

When second control switch SW2 is first deactuated, the logic output is supplied by latching circuit 315 on line 359 goes high, triggering flip-flop 355 and making its output low. A logic transition, at the clock input of flip-flop 357, from high to low does not trigger flip-flop 357 and the logic output of counter 349 remains low. As the pair of pushers P1 on belts 67 rush card C forward, switch SW2 is actuated and the logic output of latching circuit 315 on line 359 goes low. This has no effect on counter 349. When switch SW2 is again deactuated flip-flop 355 is again triggered. The output of flip-flop 355 goes high and the low to high transition at the clock input of flip-flop 357 triggers flip-flop 357. The logic output supplied by counter 349 on line 351 now goes high making both inputs to gate 347 high and its logic output low. This results in one input to each gate 333, 353 and 345 being low and the logic output of each gate going high. A logic high is now present at the J input of flip-flop 273 and the K input of flip-flops 269 and 271. After the flip-flops are triggered, octal decoder 267 has a logic high input from flip-flop 273 and a logic low input from flip-flops 269 and 271. With this combination of inputs, octal decoder 267 terminates the high supplied at its fourth output and supplies a logic high at its fifth. State W4 is created and motor M is deenergized because both inputs to gate 295 are now low and its output high. Further, the input to gate 339 from octal decoder 267 goes low and the logic output of gate 339 remains high when the logic output of multivibrator 281 again goes high.

If the logic output of multivibrator 281 goes high before second control switch SW2 is deactuated for the second time, it indicates that card C may be jammed. With the logic output of multivibrator 281 high, both inputs to gate 339 are high and its output goes low. A low input to gate 329 makes its output high and this is inverted by inverter 331 to a logic low at the input of gate 333. With a low input, the logic output of gate 333 to the K input of flip-flop 269 goes high and when flip-flop 269 is triggered, its logic output goes low. The low input supplied to gate 341 results in a low at the logic output of gate 343 which is supplied to gate 345. As noted, this occurs simultaneously with the low being supplied to the input of gate 333. A low at the input to gate 345 makes its logic output to the J input of flip-flop 273 high. When flip-flop 273 is triggered, a logic high is supplied to octal decoder 267. Octal decoder 267 now has logic high inputs from flip-flops 271 and 273, and a logic low input from flip-flop 269. For this combination of inputs, octal decoder 267 terminates the logic high at it fourth output and supplies a logic high at its seventh output. State W6 is created.

A NOR gate 361 has as one input the logic high at the seventh output of octal decoder 267. The other input to gate 361 is always low. When the input to gate 361 from octal decoder 267 goes high, the logic output of gate 361 goes low. This low is supplied through an amplifier or power driver 363 to the input of a photon-coupled SCR circuit 365 whose operation is similar to that of circuit 301 previously discussed. The result of a logic low at the output of gate 361 is an a.c. voltage applied through rectifier circuit 367 to a coil R of motor M. Motor M is actuated to drive belts 67 to return card C in the reverse direction along the predetermined path this being accomplished by the pair of pushers P2 on belts 67 engaging end E1 of card C and pushing it back. Multivibrator 283 is actuated simultaneously with motor M by a logic high supplied by an inverter 369. The logic output of multivibrator 283 goes from high to low for a period determined by the values of a resistor R11 and a capacitor C12. At the end of this period, which is approximately twenty seconds, the output of multivibrator 283 again goes high.

The output of multivibrator 283 is supplied to one input of a second circuit responsive to a logic high at the seventh output of octal decoer 267. This second circuit includes a NAND gate 371 whose logic high input from the seventh output of octal decoder 267 is initially kept low by a resistor R12 and a capacitor C13 for the reason previously discussed.

A third circuit responsive to the logic high at the seventh output of octal decoder 267 includes a NAND gate 373 having as inputs the seventh output of octal decoder 267, the output supplied by latching circuit 227 on line 313, via the R-C network comprised of a resistor R13 and a capacitor C14, and the output supplied by latching circuit 315 on line 317. The output of gate 373 is supplied to a second input of gate 353 and to one input of a NAND gate 375. The output of gate 375 is supplied to the K input of flip-flop 273. When card C clears shoulder portion 109 of trip wire 99, trip wire 99 swings up to its normal position, first control switch SW1 is deactuated and the output supplied by latching circuit 227 on line 313 goes high. Further, when pushers P2 on belts 67 push card C to the position shown in FIG. 18, which is a card return position, second control switch SW2 is actuated by a pusher P on left-hand belt 67 engaging arm 119 of the switch and pushing it outward and the logic output supplied by latching circuit 315 on line 317 goes high. All inputs to gate 373 are thus high and the logic output supplied by gate 373 to gates 353 and 375 low. With a low input, the logic output of gates 353 and 375 to the K inputs of flip-flops 271 and 273 go high and when triggered, they supply a logic low to octal decoder. Octal decoder 267 now has all inputs low and terminates the logic high at its seventh output and supplies a logic high at its first output, again creating state W0. The a.c. voltage is removed from coil R of motor M and the operations previously described when state W0 is created occur. Also, the input to gate 371 from octal decoder 267 goes low and the logic output of gate 371 remains high when the logic output of multivibrator 283 again goes high.

If the logic output of multivibrator 283 goes high before card C is delivered to the return position, which may, for example, occur if finger notch 25 is blocked, both inputs to gate 371 are high and its logic output to gate 309 goes low. With a low input, the logic output of gate 309 to the J input of flip-flop 269 goes high. When flip-flop 269 is triggered, a logic high is supplied to octal decoder 267. With the other logic inputs to octal decoder 267 already high, octal decoder 267 now has all inputs high and terminates the logic high at its seventh output and supplies a logic high at its eighth. This creates state W7 and motor M is deenergized.

A NAND gate 377 has as one input the logic high supplied at the eighth output of octal decoder 267. The other input to gate 377 is the logic output supplied by latching circuit 227 on line 313. The logic output of gate 377 is supplied to a third input of gate 329, to one input of a NAND gate 379 and to the input of an inverter 381. The other input to gate 379 is always high and the output of gate 379 is supplied to one input of a NAND gate 383. The other input to gate 383 is also always high. The logic output of gate 383 is supplied to an input of gates 375 and 353. NAND gates 379 and 383 serve as time delays so that a change in the logic output of gate 383 is supplied to gates 353 and 375 simultaneously with a change in the logic output of gate 377 being supplied to the input of gate 333 through gate 329 and inverter 331.

If card C is far enough removed when state W7 is created so that switch SW1 is deactuated, state W0 is immediately created. In this situation, the logic output supplied by latching circuit 227 on line 313 is high. If card C is not far enough removed for switch SW1 to be deactuated, the logic input to gate 377 on line 313 remains low until the card is removed far enough out of validator V for switch SW1 to be deactuated. At that time, the logic output of latching circuit 227 on line 313 goes high. Whenever switch SW1 is deactuated, the logic high on line 313 is not immediately supplied to gate 377. Rather, the input to gate 377 on line 313 remains low for a period determined by capacitor C15 and a resistor R14, which is approximately three seconds. In either of the above situations, when both inputs to gate 377 are high the logic output supplied by gate 377 goes low. This makes an input to gate 329 low and its output high. Inverter 331 inverts the output of gate 329 and supplies a logic low to gate 333. The logic output of gate 333, with a low input, is a logic high which is supplied to the K input of flip-flop 269. The output of gate 383 when gate 379 has a low input is a logic low and this is supplied to gates 353 and 375 so that they supply logic highs to the K input of flip-flops 271 and 273. When the flip-flops are triggered, the logic output of each goes low. Octal decoder 267 now has all inputs low and terminates the logic high at its eighth output and supplies a logic high at its first output. This creates state W0 as before.

When, as previously described, second control switch SW2 is deactuated for the second time prior to the logic output of multivibrator 283 going high, state W4 is created. When this occurs, further operation of drive control 263 depends upon the determination of card C validity. The logic output of gate 209 in FIG. 22B, which is the indication of card C validity, is supplied on line 211 to drive control 263 and to both inputs of a NAND gate 385 and to one input of a NAND gate 387. The logic output of gate 385 is supplied to one input of a NAND gate 389. A second input to gate 389 and to gate 387 is a logic high supplied by octal decoder 267 at its fifth output.

If card C is valid, the logic output of gate 209 on line 211 is low, making both inputs to gate 385 low and its logic output high. The inputs to gate 387 are high and low and its logic output is high. Gate 389 has both inputs high and supplies a logic low to gate 309. With a low at one of its inputs, the logic output of gate 309 goes high to the J input of flip-flop 269. The logic high output of gate 387 is supplied to gate 323 but does not effect the logic output of gate 323. When flip-flop 269 is triggered, its logic output to octal decoder 267 goes high. Octal decoder 267 has a logic high input from flip-flops 269 and 273 and a logic low input from flip-flop 271. With this combination, octal decoder 267 terminates the logic high supplied at its fifth output and supplies a logic high at its sixth. State W5 is created.

If card C is invalid, a logic high is supplied on line 211. Both inputs to gate 385 are high and its logic output low. Gate 389 has a high and a low input and its logic output remains high. Gate 387 has both inputs high making its logic output to gate 323 low. With a low input, gate 323 supplies a high to the J input of flip-flop 271. When flip-flop 271 is triggered, it supplies a logic high to octal decoder 267. Octal decoder 267 has a logic low input from flip-flop 269, and logic high inputs from flip-flops 271 and 273. Octal decoder 267 terminates the logic high at its fifth output and supplies a logic high at its seventh. State W6 is created and motor M is energized to drive belts 67 to return card C along the predetermined path from the dwell position in the manner previously discussed.

Once state W5 is attained, card C remains in the dwell position until the user of the card either elects to make a purchase or have his card returned. If the customer elects to have his card returned, he depresses return pushbutton SW4. This causes a logic high to be supplied to one input of a NAND gate 391. The other input to gate 391 is a logic high supplied by octal decoder 267 at its sixth output. With both inputs high, the logic output of gate 391 is low and is supplied to gates 333 and 323. With a low input, the logic output of gates 333 and 323 go high, and these are supplied to the K input of flip-flop 269 and the J input of flip-flop 271. When both flip-flops are triggered, flip-flop 269 supplies a logic low to octal decoder 267 and flip-flop 271 a logic high. Octal decoder 267 has as inputs a logic low from flip-flop 269 and a logic high from flip-flops 271 and 273. These are the inputs for which state W6 is created and card C is returned in the manner previously discussed.

In state W5, the logic high at the sixth output of octal decoder 267 is supplied on line 393 to one input of a NAND gate 395 shown in FIG. 22C. The other inputs to gate 395 are always high and therefore the logic output of gate 395 is low. The output of gate 395 is supplied on line 397 to one input of a plurality of relay driver circuits 399A through 399E. Each driver circuit includes a NOR gate 401 having as one input the output of gate 395; an amplifier 403, a resistor 405 and an NPN transistor 407. When transistor 407 of any relay driver circuit 399 is turned on, a ground is supplied for a coil 409 of a price relay 411A through 411E associated with that circuit and that relay is latched.

Which relay is actuated, is determined by the logic output of a plurality of NAND gates 413A through 413E shown in FIG. 22B, each gate having as an input a set of data derived from a portion of the resultant set of data stored in shift register 137. This set of data represents the value of card C and determines which price relay is latched to that a customer may select only an item whose value is equal to that represented by card C.

The bit of data in the first stage of register 137 is supplied on line 139A to one input of gates 413A through 413E. The bit in the sixth stage of register 137 is supplied on line 139F to a second input of gates 413A, 413B, 413C and 413E, and through an inverter 415 to a second input of gate 413D. The bit in the eleventh stage of register 137 is supplied on line 139K to a third input of gates 413A, 413B and 413D and through an inverter 417 to a third input of gates 413C and 413E. Finally, the bit in the 16th stage of register 137 is supplied on line 139P to a fourth input of gates 413A, 413C and 413D, and through an inverter 419 to a fourth input of gates 413B and 413E. The logic output of gate 413A is supplied on line 421A to a second input of relay driver circuit 399A; while that of gate 413B is supplied on line 421B to a second input of circuit 399B; that of gate 413C on line 421C to a second input of circuit 399C; that of gate 413D on line 421D to a second input of circuit 399D; and that of gate 413E on line 421E to a second input of circuit 399E. The logic output of any gate 413 is low only when all its inputs are high and only one gate 413 has a low output on the basis of the data bit inputs to gates 413 so that only one relay is latched.

When a card user selects an item, a switch SW5 shown in FIG. 23 is actuated during the delivery of the item to the customer and a logic high is supplied to one input of a NAND gate 423. The other input of gate 423 is the logic high supplied by octal decoder 267 at its sixth output. With both inputs high, the logic output of gate 423 is low and is supplied to a fourth input of gate 333 and a third input of gate 375. With low inputs, the output of gates 333 and 375 to the K input of flip-flops 269 and 273 is high. When both flip-flops are triggered their logic outputs to octal decoder 267 go low. Octal decoder 267 has all inputs low and terminates the logic high supplied at its sixth output and supplies a logic high at its first output. State W0 is created and motor M is energized as before to drive belts 67 in a forward direction. Pushers P1 now move card C forward along the predetermined path from the dwell position to a position where card C falls off the predetermined path and into a card collection bin (not shown). When this operation is completed, state W2 is created and validator V is ready for the next card C to be inserted.

In summary, operation of card validator V is as follows:

When power is applied to validator V, drive control 263 enters state W0. This causes a.c. voltage to be applied to coil F of reversible electric motor M to drive belts 67 in forward direction to a starting position which is reached when a pusher P on the left-hand belt 67 engages cam edge 121 of operating arm 119 and swings it laterally outward to actuate switch SW2. This causes drive control 263 to enter state W2 and motor M is deenergized with a first pair of pushers P1 on belts 67 trailing the entry position of a card and a second pair of pushers P2 leading the entry position (as generally shown in FIGS. 4 and 15).

Upon insertion of card C into the entry position (see FIGS. 4 and 15), the leading edge E1 of card C engages shoulder portion 109 of trip wire 99, depressing trip wire 99 and actuating switch SW1. Two things thereupon occur: first, the aforesaid initialization circuitry of the card validating electronics is actuated and the logic outputs of this circuitry initialize the electronics preparing it to receive and process data from the code A on card C; secondly, drive control 263 is placed in state W3 causing a.c. voltage to be applied again to coil F of motor M. Belts 67 are thereupon driven to move card C forward past the permanent magnet 33 and the magnetic head H from the entry position to the dwell or escrow position of FIG. 16. This is accomplished by the pair of pushers P1 on belts 67 engaging the trailing edge E2 of card C and pushing it forward through the channel 9.

As the blocks of data A1, A2 and A3 on card C pass over head H, transducer 127 (including head H) senses the lines L1 and L2 of magnetic material comprising each block and data reading means 125 supplies an electrical signal representative of the data in each block. This data is processed by combining it with data from the other blocks on card C and the resultant set of data thereby obtained is compared with a preselected set of data to determine if the two sets of data are identical. When card C reaches the dwell or escrow position, as shown in FIG. 16, drive control 263 enters state W4 and motor M is deenergized.

After all blocks of data on card C have been sensed, a validity determination is made and a signal indicating card validity (assuming the card to be valid) is supplied to drive control 263 by the logic output of gate 209 on line 211. If the resultant and preselected sets of data are identical, a validity indication is given and drive control 263 goes from state W4 to state W5. If the card is invalid, however, the indication given drive control 263 causes it to go from state W4 to state W6.

In state W6, coil R of motor M is energized and belts 67 are driven in the reverse direction to return card C from the dwell position to a position upstream from the entry position protruding into the finger notch 25 for retrieval by the user. This is accomplished by the pair of pushers P2 on belts 67 engaging the leading edge E1 of the card and pushing it back along the predetermined path in channel 9. As shown in FIG. 18, return of card C from the dwell position results in switch SW1 being deactuated and switch SW2 being actuated, causing drive control 263 to reenter state W0 and thence state W2. If, for some reason, the card should be blocked from returning far enough to deactuate switch SW1, drive control 263 enters state W7 and remains there until the card is removed, at which time state W0 and then state W2 are created.

Figure 17:
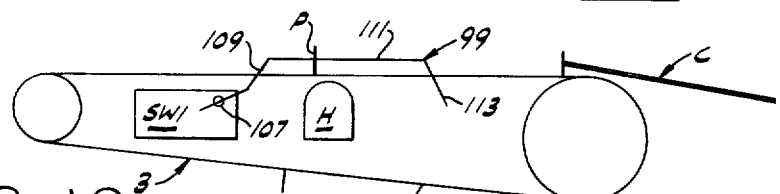
FIG. 17 is a view similar to FIGS. 15 and 16 showing a card being collected (e.g., upon a vend)

Drive control 263 remains in state W5 with card C in the dwell position until the purchaser either makes a selection or elects to have card C returned. If the purchaser wants his card returned, he pushes switch SW4 which causes drive control 263 to enter state W6 and card C is returned as above described. If he makes a selection, switch SW5 is actuated during delivery of the item to the purchaser, causing drive control 263 to enter state W0. Motor M is then energized to drive belts 67 to move card C forward, as shown in FIG. 17, so that it falls into a collection bin.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for validating a card having positioned thereon a plurality of redundant encoded blocks of data readable by moving the card past a reader comprising:
   a reader for sensing each block of data on the card and for supplying an electrical signal representative thereof;

means responsive to the electrical signal from the reader for storing the data from each block as it is sensed;

means for comparing the stored set of data from each block with a preselected set of data; and means for supplying an indication of card validity if a stored set of data and the preselected set of data are identical.

2. Apparatus as set forth in claim 1 wherein the data storage means includes a data storage register whose data bit contents comprise a stored set of data, and means for combining a set of data from one block stored in the register with the data from a subsequent block as it is sensed thereby to produce a resultant set of data which is compared with the preselected set of data.

3. Apparatus as set forth in claim 2 further including means for inhibiting the validity indicating means from supplying an indication of card validity until all blocks of data on the card have been sensed.

4. Apparatus as set forth in claim 3 wherein the reader includes a transducer for sensing lines of magnetic material a plurality of which comprise each block of data on the card, and a permanent magnet for reinforcing the magnetic strength of said lines to enhance their sensing by the transducer, said magnet erasing magnetic images on counterfeit cards to prevent any blocks of data thereon from being sensed, and the magnetic strength of the lines on any valid card so tampered with that the lines thereon are of less than a given length being insufficient for such lines to be sensed by the transducer.

5. Apparatus for validating a card having positioned thereon a plurality of redundant encoded blocks of data readable by moving the card past a reader comprising:

a reader for sensing each block of data on the card and for supplying an electrical signal representative thereof;

means responsive to the electrical signal from the reader for combining the data from at least one block, as it is sensed, with a prior set of data to produce a resultant set thereof;

means for comparing the resultant set of data with a preselected set thereof; and means for supplying an indication of card validity if the resultant and preselected sets of data are identical.

6. Apparatus as set forth in claim 5 wherein the reader includes a transducer for sensing lines of magnetic material of either of two widths each of which lines represents one element of data in a block thereof on the card and for supplying an electrical output signal comprised of a sequence of first and second signal elements, each first signal element being representative of one binary value which corresponds to a line of a first width sensed by the transducer and each second signal element being representative of the other binary value which corresponds to a second and lesser width of line sensed by the transducer, the sequence of first and second signal elements corresponding to the sequence of first and second lines comprising a block of data on the card.

7. Apparatus as set forth in claim 6 further including a preamplifier for amplifying and shaping the first and second signal elements thereby to supply an electrical signal whose first signal elements each have a first predetermined time duration proportional to the width of each first line of magnetic material sensed by the transducer and whose second signal elements each have a second and shorter predetermined time duration proportional to the width of each second line.

8. Apparatus as set forth in claim 7 further including a permanent magnet for reinforcing the magnetic strength of the lines of magnetic material on the card to enhance their sensing by the transducer, and for erasing magnetic images on counterfeit cards to prevent any blocks of data thereon from being sensed.

9. Apparatus as set forth in claim 5 wherein the means responsive to the electrical signal from the reader includes means for storing a set of data bits each of which represents an element of data in a block on the card sensed by the reader and has a corresponding binary value, means responsive to the failure of the reader to sense an element of data in a block on the card because of the absence of the data element to cause a pseudo-bit of data having a predetermined binary value to be stored in the storage means in a position corresponding to the position in the block on the card of the data element which the reader was unable to sense, said combining means operating to combine the stored data bits with an electrical signal from the reader representing the sensing by the reader of a subsequent block of data to replace pseudo-bits of data previously stored with data bits having the binary value the data elements in the prior block on the card which the reader was unable to sense should have had and to replace data bits having incorrect binary values with data bits having correct binary values, the data bits with incorrect binary values having been previously stored because of the sensing by the reader of data elements in a prior block which were damaged, whereby the data bits stored in the storage means after all the redundant encoded blocks of data on the card have been sensed by the reader represent the best combination of data derived from all the blocks on the card.

10. Apparatus as set forth in claim 9 wherein the storage means includes a shift register having a first stage into which bits of data are loaded and intermediate stages through which each data bit so loaded is sequentially shifted, said shift register having a final stage into which each bit is shifted thereby to supply the elements of an output signal from the final stage.

11. Apparatus as set forth in claim 10 wherein the electrical signal from the reader comprises a sequence of first and second signal elements and the means for combining the stored data bits with an electrical signal from the reader includes means for combining each element of the electrical signal from the reader with an element of the output signal from the final stage of the shift register to produce one bit of the resultant set of data for loading into the first stage of the shift register, the binary value of the resultant bit produced being determined by the binary values of the signal elements combined, each first signal element of the electrical signal from the reader having a first predetermined time duration representative of one binary value which corresponds to a line of magnetic material on the card of a first width, each second signal element having a second and shorter predetermined time duration representative of the other binary value which corresponds to a line of magnetic material on the card of a second and lesser width, and the element of the output signal from the final stage of the shift register representing a bit of data of the prior set whose position in said set corresponds to the position of the element of data in the block on the card represented by the element of the electrical signal from the reader.

12. Apparatus as set forth in claim 11 wherein the combining means includes a first NAND gate one input of which is supplied with the elements of the electrical signal from the reader, an inverter whose input is supplied with the elements of the output signal from the final stage of the shift register, and a second NAND gate whose inputs are supplied with the output signals from the first NAND gate and the inverter and whose output signal, which represents one bit of the resultant set of data, is supplied to the load input of the first stage of the shift register.

13. Apparatus as set forth in claim 12 wherein the shift register further includes means for setting its data bit contents to binary zeroes prior to the sensing by the reader of the first block of data on the card, these shift register contents being used as a prior set of data for combining with the data from the first block on the card, the resultant set of data produced thereby being used as the prior set of data for combining with the data from the next block of data on the card, and the aforesaid sequence being continued for the combining of succeeding blocks of data.

14. Apparatus as set forth in claim 11 wherein the means for causing pseudo-bits of data to be stored in the storage means includes a data controller responsive to the electrical signal from the reader for supplying shift signals to the shift register for loading data bits thereinto and shifting data bits therein.

15. Apparatus as set forth in claim 14 wherein the data controller includes a master timing oscillator, a data control counter and a flip-flop, the data control counter being responsive to timing pulses supplied by the master timing oscillator to continuously count from zero to a preselected value and then reset to zero and to supply a first signal at a first predetermined count value and a second signal at a second predetermined count value to the flip-flop, the first signal triggering the flip-flop to supply a shift signal to the shift register to load a data bit into the first stage thereof and shift data bits therein and the second signal triggering the flip-flop to terminate the shift signal, the period between the time when the data control counter is reset to zero and the time when it attains its first preselected count value being shorter than the predetermined time duration of a first signal element of the electrical signal from the reader but longer than the predetermined time duration of a second signal element thereof.

16. Apparatus as set forth in claim 15 further including means for resetting the contents of the data control counter to zero whenever the leading edge of any element of the electrical signal supplied by the reader occurs, the data control counter supplying the first and second signals to the flip-flop during each successive count cycle after the last one initiated by the occurrence of said leading edge, the first and second signals triggering the flip-flop to supply a shift signal during each succeeding count cycle to the shift register to load a pseudo bit of data having a predetermined binary value into the first stage thereof and shift data bits therein thus keeping the relative position of the data bits in the register in correspondence with the relative position of the elements of data in the block on the card being sensed by the reader even though the reader is unable to sense succeeding data elements in the block on the card because of the absence thereof.

17. Apparatus as set forth in claim 16 further including a flip-flop and a successive drop-out counter which responds to each shift signal to increment its contents from zero to a preselected value equal to the maximum number of successive data elements in a block on the card which the reader is unable to sense before the combining means is inhibited from responding to the electrical signal supplied by the reader, the contents of the successive drop-out counter being reset upon the occurrence of the leading edge of an element of the electrical signal from the reader, and an output signal of the successive drop-out counter triggering the flip-flop to supply an inhibit signal to the combining means if the contents of the successive drop-out counter reach the preselected value.

18. Apparatus as set forth in claim 17 further including a data bit counter responsive to each shift signal to increment its contents from zero to a preselected value equal to the number of data elements contained in each block on the card, the data bit counter supplying a signal to reset the flip-flop triggered by the successive drop-out counter and to inhibit the data control counter from counting whenever the contents of the data bit counter equal the number of data elements in a block on the card, the data bit counter being reset on the occurrence of the leading edge of the element of the electrical signal from the reader which corresponds to the sensing by the reader of the first data element in the next block on the card, and the contents of the shift register when the data bit counter supplies the aforesaid signal comprising the resultant set of data.

19. Apparatus as set forth in claim 5 wherein the comparison means includes a plurality of logic means each having as inputs one data bit from the preselected set of data and one data bit from the resultant set of data, the output signal from each logic means being supplied to one of two comparators, the output signal from the first comparator being supplied to the second comparator, and the second comparator supplying an output signal indicating card validity if the two sets of data are identical.

20. Apparatus as set forth in claim 19 wherein each logic means is an Exclusive-OR gate.

21. Apparatus as set forth in claim 5 wherein the means supplying the indication of card validity includes a NAND gate having as one of its inputs an output signal indicating card validity supplied by the comparison means.

22. Apparatus as set forth in claim 21 further including means for inhibiting the indication of card validity until after all blocks of data on the card have been sensed.

23. Apparatus as set forth in claim 22 wherein the inhibiting means includes a data block counter responsive to a signal supplied each time the total number of data elements in a block on the card have been sensed by the reader to increment the contents of the data block counter from zero to a preselected value equal to the number of data blocks on the card, said data block counter supplying an inhibit signal to a second input of the NAND gate until the contents thereof euqal the preselected value.

24. Apparatus as set forth in claim 23 further including means responsive to an output signal supplied by the data block counter when its contents equal the preselected value to inhibit further operation of the data combining means.

25. Apparatus as set forth in claim 5 further including a plurality of relays one of which is actuated by a signal supplied by means responsive to the indication of card validity, the relay actuated being determined by the output signals from a plurality of logic means, each logic means having as the input thereto one of a set of data derived from a portion of the resultant set of data.

26. Apparatus as set forth in claim 25 wherein each logic means is a NAND gate.

27. Apparatus as set forth in claim 5 further including means for sensing the presence of a card whose validity is to be determined and for supplying an indication thereof.

28. Apparatus as set forth in claim 7 further including means responsive to the indication supplied by the card sensing means for resetting the means responsive to the electrical signal from the reader, and for providing noise blanking for a substantial portion of the time between the first sensing of the card by the card sensing means and the sensing by the reader of the first data block on the card.

29. Apparatus as set forth in claim 28 wherein the card sensing means is a switch actuated by the card when it is positioned on means for moving it past the reader.

30. Apparatus as set forth in claim 29 wherein the means responsive to the indication of the card sensing means includes a first flip-fop trigerable by the response of the card sensing means to the presence of a card, a monostable multivibrator actuated by a signal from the first flip-flop when it is triggered, a second flip-flop resettable by a signal from the multivibrator when it is actuated, and a NAND gate responsive to the occurrence of the leading edge of the first element of the electrical signal from the reader to trigger the second flip-flop, the output signals of the monostable multivibrator, when it is actuated, and the second flip-flop, when it is reset, resetting the means responsive to the electrical signal from the reader and providing noise blanking, the noise blanking continuing until the second flip-flop is triggered.

31. Apparatus as set forth in claim 30 further including means responsive to the sensing by the reader of the last element of data in one block on the card to provide noise blanking for a substantial portion of the time between the aforesaid sensing by the reader and the time the reader senses the first element of data in the next block on the card.

32. Apparatus as set forth in claim 31 wherein the means includes a monostable multivibrator actuated by a signal representative of the sensing by the reader of the last element of data in a block on the card, said multivibrator, when actuated, inhibiting the supply of timing pulses from a source thereof to the means responsive to the electrical signal from the reader.

33. Apparatus for controlling the movement of a card whose validity is to be determined and which has positioned thereon a plurality of redundant encoded blocks of data comprising:
means for transporting a card along a predetermined path, the card being movable forward along the path from an entry position to a dwell position;
means for driving the card transport means to move the card along the path;
a reader for sensing each block of data on the card as it moves forward along the path from the entry position and for supplying an output signal representative thereof;
means responsive to the output signal from the reader for determining card validity and for supplying an indication thereof, the means using the data from at least one block in making the validity determination; and means for controlling the drive means, said means being responsive to the positioning of the card in the entry position to the predetermined path to actuate the drive means to drive the card transport means to move the card forward along the path, to the card reaching the dwell position to deactuate the drive means, and to a validity indication from the validity determining means to keep the drive means deactuated but if no indication of card validity is supplied to the drive control means, the drive control means will actuate the drive means to drive the card transport means to move the card along the predetermined path from the dwell position to the entry position.

34. Apparatus as set forth in claim 33 wherein the drive control means includes means for actuating the drive means to drive the card transport means to move the card in a reverse direction along the predetermined path from the dwell position to the entry position if no indication of card validity is supplied to the drive control means.

35. Apparatus as set forth in claim 33 wherein the card transport means includes an endless conveyor and a series of pushers carried thereon, the pushers being spaced at equal intervals along the length of the conveyor with the spacing being greater than the length of a card, and the conveyor being movable forward from a starting position for a first pusher, trailing the card in the entry position to the predetermined path, to engage the trailing end of the card and push it forward from the entry position to the dwell position, and for a second pusher, leading the card in the entry position, to move forward to a second position leading the card in the dwell position.

36. Apparatus as set forth in claim 35 wherein the conveyor comprises at least one endless belt and the pushers are pins extending outwardly from the belts.

37. Apparatus as set forth in claim 33 wherein the drive means includes a reversible electric motor and a drive which is irreversible from the card transport means back to the motor.

38. Apparatus as set forth in claim 33 wherein the reader includes a transducer for sensing lines of magnetic material of either of two widths, a sequence of said lines comprising each block of data on the card, and for supplying an electrical output signal comprised of first and second signal elements in response thereto, the sequence of first and second signal elements corresponding to the sequence of line widths in the blocks on the card.

39. Apparatus as set forth in claim 33 wherein the validity determining means includes means responsive to an electrical signal from the reader comprised of a plurality of signal elements and representing the data in a block on the card to combine said signal elements with a prior set of data to produce a resultant set thereof, to compare the resultant set of data with a preselected set, and to supply a signal indicating card validity if the preselected and resultant sets of data are identical.

40. Apparatus as set forth in claim 33 wherein the drive control means includes an octal decoder having eight outputs and a plurality of flip-flops, the octal decoder supplying a signal having one of two logic levels at each output, each flip-flop supplying signals having one of two logic levels to the decoder, and the decoder being responsive to the signals from the flip-flops to supply a signal at one of its eight outputs having a logic level different from that of the signals supplied at each of its other outputs.

41. Apparatus as set forth in claim 40 further including means responsive to the application of power to the drive control means to reset the flip-flops, the octal decoder being responsive to the signals from the flip-flops when they are reset to supply the signal at its first output.

42. Apparatus as set forth in claim 41 further including a first means responsive to the signal supplied by the octal decoder at its further output to simultaneously actuate the drive means and the first of two monostable multivibrators, the drive means being actuated to drive the card transport means to a starting position which allows a card to be placed in the entry position to the predetermined path, a second means responsive to the signal supplied by the octal decoder at its first output and to a signal supplied by the first monostable multivibrator after a predetermined time period to trigger one of the flip-flops to supply a signal to the octal decoder to terminate the signal supplied at its front output and supply the signal at its second output, and a third means responsive to the signal supplied by the octal decoder at its first output and to signals indicating that no card is in the entry position to the predetermined path and that the card transport means has attained its starting position to trigger a second of the flip-flops to supply a signal to the octal decoder to terminate the signal supplied at its first output and supply the signal at its third output whereby the card transport means attaining its starting position prior to the supplying of a signal by the first monostable multivibrator indicates that the drive means and card transport means are operating properly.

43. Apparatus as set forth in claim 42 further including means responsive to the signal supplied by the octal decoder at its third output and a signal initiated when a card is placed in the entry position to the predetermined path to trigger one of the flip-flops to supply a signal to the octal decoder to terminate the signal supplied at its third output and supply the signal at its fourth output.

44. Apparatus as set forth in claim 43 wherein the first means responsive to the signal supplied by the octal decoder at its first output is further responsive to the signal supplied by the octal decoder at its fourth output to simultaneously actuate the drive means and the first monostable multivibrator, the drive means being actuated to drive the card transport means to move the card forward along the predetermined path from the entry position.

45. Apparatus as set forth in claim 44 further including a first means responsive to the signal supplied by the octal decoder at its fourth output and to a signal supplied by the first monostable multivibrator after the first predetermined time period to trigger two of the flip-flops to supply signals to the octal decoder to terminate the signal at its fourth output and supply the signal at its seventh output, and a second means responsive to the signal supplied by the octal decoder at its fourth output and a signal initiated when the card arrives at the dwell position to trigger each of the flip-flops to supply signals to the octal decoder to terminate the signal at its fourth output and supply the signal at its fifth output whereby the failure of the card to reach the dwell position prior to the first monostable multivibrator supplying an output signal indicates that the card has jammed in the card transport means and that return of the card should be initiated in order to clear the jam.

46. Apparatus as set forth in claim 45 further including means responsive to the signal supplied by the octal decoder at its fifth output and to the indication supplied by the validity determining means to trigger one of the flip-flops, if the card is valid, to supply a signal to the octal decoder to terminate the signal at its fifth output and supply the signal at its sixth output, but to trigger another of the flip-flops, if the card is invalid, to supply a signal to the octal decoder to terminate the signal at its fifth output and supply the signal at its seventh output whereby if the card is valid, the drive means remains deactuated but if the card is invalid, the return of the card is initiated.

47. Apparatus as set forth in claim 46 further including means responsive to the signal supplied by the octal decoder at its sixth output and an indication that the card is to be collected to trigger two of the flip-flops to supply signals to the octal decoder to terminate the signal at its sixth output and supply the signal at its first output thereby to actuate the drive means to drive the card transport means to move the card forward along the predetermined path to a point of card collection.

48. Apparatus as set forth in claim 47 further including means responsive to the signal supplied by the octal decoder at its sixth output and a signal indicating that the card is to be returned to trigger two of the flip-flops to supply signals to the octal decoder to terminate the signal at its sixth output and supply a signal at its seventh output thereby to initiate return of the card.

49. Apparatus as set forth in claim 48 further including a first means responsive to the signal supplied by the octal decoder at its seventh output to simultaneously actuate the drive means and the second of the two monostable multivibrators, the drive means being actuated to drive the card transport means in the reverse direction to return the card along the predetermined path from the dwell position to the entry position, a second means responsive to the signal supplied by the octal decoder at its seventh output and to a signal supplied by the second monostable multivibrator after a second predetermined time period which is longer than the first predetermined time period to trigger one of the flip-flops thereby to supply a signal to the octal decoder to terminate the signal supplied at its seventh output and supply the signal at its eighth output, and a third means responsive to the signal supplied by the octal decoder at its seventh output and to signals indicating that the card transport means is at its starting position and that the card has been removed from the entry position to trigger two of the flip-flops to supply signals to the octal decoder to terminate the signal supplied at its seventh output and supply the signal at its first output whereby the return of the card to the entry position to the predetermined path and the card transport means attaining its starting position prior to the supplying of an output signal by the second monostable multivibrator indicates that no card jamming in the card transport means has occurred.

50. Apparatus as set forth in claim 49 further including means responsive to the signal supplied by the octal decoder at its eighth output and to a signal initiated by the removal of the card from the entry position to the predetermined path to trigger each of the flip-flops to supply a signal to the octal decoder to terminate the signal at its eighth output and supply the signal at its first output.

51. Apparatus as set forth in claim 50 further including means responsive to the signal supplied by the octal decoder at its second output to inhibit the drive control means from responding to the placing of a card in the entry position to the predetermined path thereby to prevent damage to the drive means and card transport means.

52. Apparatus as set forth in claim 51 wherein the means responsive to the signal supplied by the octal decoder at its second output is further responsive to a signal supplied by the actuation of a manual switch to trigger one of the flip-flops to supply a signal to the octal decoder to terminate the signal at its second output and supply the signal at its first output thereby to reset the drive control means.

53. Apparatus as set forth in claim 52 further including means responsive to the card transport means attaining its starting position to supply one of the signals to the second means responsive to the signal supplied by the octal decoder at its first output.

54. Apparatus as set forth in claim 53 wherein the means includes a switch actuated by the card transport means when it attains its starting position and a flip-flop, the flip-flop being reset when the octal decoder first supplies a signal at its first output and being triggered when the switch is actuated.

55. Apparatus as set forth in claim 54 further including a pair of flip-flops constituting a counter, the contents of the counter being incremented upon each deactuation of the switch, the counter being reset by the signal supplied by the octal decoder at its third output, and the counter supplying a signal to the second means responsive to the signal supplied by the octal decoder at its fourth output the second time the switch is deactuated which corresponds to the card reaching the dwell position on the predetermined path.

56. Apparatus as set forth in claim 55 further including means responsive to the positioning of the card at the entry position to the predetermined path to supply a signal to the means responsive to the signal supplied by the octal decoder at its third output, to the third means responsive to the signal supplied by the octal decoder at its seventh output and to the means responsive to the signal supplied by the octal decoder at its eighth output.

57. Apparatus as set forth in claim 56 wherein the means includes a switch and a pair of NAND gates comprising a latch circuit, the switch being actuated by the positioning of the card in the entry position to the predetermined path and deactuated upon its removal therefrom, the actuation of the switch latching the circuit in one of two operating states, whereby first and second signals are supplied to the aforesaid means responsive to the signal supplied by the octal decoder, and the deactuation of the switch latching the circuit in the other operation state whereby the first and second signals are supplied in reverse order to the aforesaid means responsive to the signal supplied by the octal decoder.

* * * * *